US009843743B2

(12) United States Patent
Lewis et al.

(10) Patent No.: US 9,843,743 B2
(45) Date of Patent: Dec. 12, 2017

(54) INFANT MONITORING SYSTEMS AND METHODS USING THERMAL IMAGING

(71) Applicant: FLIR Systems, Inc., Wilsonville, OR (US)

(72) Inventors: Earl R. Lewis, Boston, MA (US); Andrew C. Teich, West Linn, OR (US); Jeffrey D. Frank, Santa Barbara, CA (US); Arthur Stout, Goleta, CA (US); Nicholas Högasten, Santa Barbara, CA (US); Theodore R. Hoelter, Goleta, CA (US); Katrin Strandemar, Rimbo (SE)

(73) Assignee: FLIR Systems, Inc., Wilsonville, OR (US)

( * ) Notice: Subject to any disclaimer, the term of this patent is extended or adjusted under 35 U.S.C. 154(b) by 718 days.

(21) Appl. No.: 13/940,232

(22) Filed: Jul. 11, 2013

(65) Prior Publication Data

US 2013/0342691 A1     Dec. 26, 2013

Related U.S. Application Data

(63) Continuation-in-part of application No. 12/477,828, filed on Jun. 3, 2009, now Pat. No. 8,749,635, and a
(Continued)

(51) Int. Cl.
*H04N 5/33* (2006.01)
*H04N 7/18* (2006.01)
(Continued)

(52) U.S. Cl.
CPC ............. *H04N 5/33* (2013.01); *H04N 5/2253* (2013.01); *H04N 5/2257* (2013.01);
(Continued)

(58) Field of Classification Search
CPC .................................................... H04N 5/33
(Continued)

(56) References Cited

U.S. PATENT DOCUMENTS 2,764,055 A    9/1956  Clemens et al.
4,489,314 A *  12/1984 Miller ........................ 340/568.6
(Continued)

FOREIGN PATENT DOCUMENTS

CA    2764055    7/2012
CN    2874947    2/2007
(Continued)

OTHER PUBLICATIONS

Frankenberger et al., "Measuring Lateral Skin Temperature Profiles of Preterm Infants in Incubators by Thermography". Biomedizinische Technik, Jun. 1, 1998, pp. 174-178, vol. 43, No. 6, Fachverlag Schiele Und Schoen GMBH. Berlin, DE.
(Continued)

*Primary Examiner* — Leron Beck
(74) *Attorney, Agent, or Firm* — Haynes and Boone, LLP

(57) ABSTRACT

Various techniques are disclosed for systems and methods using thermal imaging to monitor an infant or other persons that may need observation. For example, an infant monitoring system may include an infrared imaging module, a visible light camera, a processor, a display, a communication module, and a memory. The monitoring system may capture thermal images of a scene including at least a partial view of an infant, using the infrared imaging module enclosed in a portable or mountable housing configured to be positioned for remote monitoring of the infant. Various thermal image processing and analysis operations may be performed on the thermal images to generate monitoring information relating to the infant. The monitoring information may include various alarms that actively provide warnings to caregivers,
(Continued)

and user-viewable images of the scene. The monitoring information may be presented at external devices or the display located remotely for convenient viewing by caregivers.

18 Claims, 15 Drawing Sheets

Related U.S. Application Data continuation-in-part of application No. 13/437,645, filed on Apr. 2, 2012, now Pat. No. 9,171,361, which is a continuation-in-part of application No. 13/105,765, filed on May 11, 2011, now Pat. No. 8,565,547, which is a continuation of application No. PCT/EP2011/056432, filed on Apr. 21, 2011, which is a continuation-in-part of application No. 12/766,739, filed on Apr. 23, 2010, now Pat. No. 8,520,970, application No. 13/940,232, which is a continuation-in-part of application No. PCT/US2012/041744, filed on Jun. 8, 2012, and a continuation-in-part of application No. PCT/US2012/041749, filed on Jun. 8, 2012, and a continuation-in-part of application No. PCT/US2012/041739, filed on Jun. 8, 2012, said application No. 13/437,645 is a continuation-in-part of application No. 12/766,739, filed on Apr. 23, 2010, now Pat. No. 8,520,970, said application No. 13/105,765 is a continuation-in-part of application No. 12/766,739, filed on Apr. 23, 2010, now Pat. No. 8,520,970, application No. 13/940,232, which is a continuation-in-part of application No. 13/105,765, filed on May 11, 2011, now Pat. No. 8,565,547, and a continuation-in-part of application No. 12/766,739, filed on Apr. 23, 2010, now Pat. No. 8,520,970.

(60) Provisional application No. 61/670,824, filed on Jul. 12, 2012, provisional application No. 61/748,018, filed on Dec. 31, 2012, provisional application No. 61/792,582, filed on Mar. 15, 2013, provisional application No. 61/793,952, filed on Mar. 15, 2013, provisional application No. 61/746,069, filed on Dec. 26, 2012, provisional application No. 61/746,074, filed on Dec. 26, 2012, provisional application No. 61/473,207, filed on Apr. 8, 2011, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.
*H04N 5/225* (2006.01)
*H04N 5/232* (2006.01)

(52) U.S. Cl.
CPC ......... *H04N 5/23209* (2013.01); *H04N 5/332* (2013.01); *H04N 7/18* (2013.01); *H04N 7/181* (2013.01)

(58) Field of Classification Search
USPC ....................................................... 348/143
See application file for complete search history.

(56) References Cited

U.S. PATENT DOCUMENTS

| | | | | |
|---|---|---|---|---|
| 4,558,708 | A | * | 12/1985 | Labuda et al. ................ 600/532 |
| 4,595,016 | A | * | 6/1986 | Fertig et al. .................. 600/532 |
| 4,661,986 | A | | 4/1987 | Adelson |
| 5,140,416 | A | | 8/1992 | Tinkler |
| 5,210,532 | A | * | 5/1993 | Knoedler et al. .......... 340/12.55 |
| 5,309,921 | A | * | 5/1994 | Kisner et al. ................. 600/532 |
| 5,386,831 | A | * | 2/1995 | Gluck ........................... 600/474 |
| 5,446,934 | A | * | 9/1995 | Frazier ............................. 5/655 |
| 5,488,674 | A | | 1/1996 | Burt et al. |
| 5,555,891 | A | * | 9/1996 | Eisenfeld ...................... 600/534 |
| 5,680,520 | A | * | 10/1997 | Watanabe et al. ............ 345/471 |
| 5,689,241 | A | * | 11/1997 | Clarke et al. ................. 340/575 |
| 5,704,367 | A | | 1/1998 | Ishikawa et al. |
| 5,818,535 | A | * | 10/1998 | Asnis ................... H04N 19/503 348/416.1 |
| 5,903,659 | A | | 5/1999 | Kilgore |
| 6,011,477 | A | * | 1/2000 | Teodorescu et al. ....... 340/573.1 |
| 6,043,747 | A | * | 3/2000 | Altenhofen ................ 340/573.1 |
| 6,072,392 | A | * | 6/2000 | Henderson et al. ..... 340/539.15 |
| 6,091,329 | A | * | 7/2000 | Newman .................. 340/539.15 |
| 6,091,546 | A | * | 7/2000 | Spitzer ......................... 359/618 |
| 6,208,897 | B1 | * | 3/2001 | Jorgenson ............ A61B 5/0205 128/898 |
| 6,213,955 | B1 | * | 4/2001 | Karakasoglu et al. ....... 600/529 |
| 6,280,392 | B1 | * | 8/2001 | Yoshimi et al. .............. 600/534 |
| 6,297,794 | B1 | | 10/2001 | Tsubouchi et al. |
| 6,330,371 | B1 | | 12/2001 | Chen et al. |
| 6,343,860 | B1 | * | 2/2002 | Pierotti ..................... 351/159.72 |
| 6,348,951 | B1 | | 2/2002 | Kim |
| 6,396,543 | B1 | | 5/2002 | Shin et al. |
| 6,424,843 | B1 | | 7/2002 | Reitmaa et al. |
| 6,462,664 | B1 | * | 10/2002 | Cuijpers et al. ........... 340/573.1 |
| 6,546,115 | B1 | * | 4/2003 | Ito et al. ....................... 382/100 |
| 6,593,851 | B1 | * | 7/2003 | Bornstein ................. 340/539.15 |
| 6,633,231 | B1 | | 10/2003 | Okamoto et al. |
| 6,681,120 | B1 | | 1/2004 | Kim |
| 6,759,949 | B2 | | 7/2004 | Miyahara |
| 6,883,054 | B2 | | 4/2005 | Yamaguchi et al. |
| 6,911,652 | B2 | | 6/2005 | Walkenstein |
| 6,975,230 | B1 | * | 12/2005 | Brilman .................... 340/573.1 |
| 7,049,968 | B2 | * | 5/2006 | Fitzgerald et al. ........ 340/573.1 |
| 7,050,107 | B1 | | 5/2006 | Frank et al. |
| D524,785 | S | | 7/2006 | Huang |
| 7,084,857 | B2 | | 8/2006 | Lieberman et al. |
| 7,199,366 | B2 | | 4/2007 | Hahn et al. |
| 7,208,733 | B2 | | 4/2007 | Mian et al. |
| 7,263,379 | B1 | | 8/2007 | Parkulo et al. |
| 7,284,921 | B2 | | 10/2007 | Lapstun et al. |
| 7,296,747 | B2 | | 11/2007 | Rohs |
| 7,305,368 | B2 | | 12/2007 | Lieberman et al. |
| 7,321,783 | B2 | | 1/2008 | Kim |
| 7,333,832 | B2 | | 2/2008 | Tsai et al. |
| 7,377,835 | B2 | | 5/2008 | Parkulo et al. |
| 7,420,663 | B2 | | 9/2008 | Wang et al. |
| 7,453,064 | B2 | | 11/2008 | Lee |
| 7,477,309 | B2 | | 1/2009 | Cuccias |
| 7,567,818 | B2 | | 7/2009 | Pylkko |
| 7,572,077 | B2 | | 8/2009 | Lapstun et al. |
| 7,575,077 | B2 | | 8/2009 | Priepke et al. |
| 7,595,904 | B2 | | 9/2009 | Lapstun et al. |
| 7,616,877 | B2 | | 11/2009 | Zarnowski et al. |
| 7,620,265 | B1 | | 11/2009 | Wolff et al. |
| 7,627,364 | B2 | | 12/2009 | Sato |
| 7,697,962 | B2 | | 4/2010 | Cradick et al. |
| 7,723,686 | B2 | | 5/2010 | Hannebauer |
| 7,725,141 | B2 | | 5/2010 | Su |
| 7,728,281 | B2 | | 6/2010 | Chen |
| 7,734,061 | B2 | * | 6/2010 | Breed et al. ................. 382/100 |
| 7,735,974 | B2 | | 6/2010 | Silverbrook et al. |
| 7,747,454 | B2 | | 6/2010 | Bartfeld et al. |
| 7,760,919 | B2 | | 7/2010 | Namgoong |
| 7,761,114 | B2 | | 7/2010 | Silverbrook et al. |
| 7,773,870 | B2 | | 8/2010 | Naruse |
| 7,774,032 | B2 | * | 8/2010 | Swan et al. ................. 455/575.3 |
| 7,801,733 | B2 | | 9/2010 | Lee et al. |

(56) References Cited

U.S. PATENT DOCUMENTS

| | | | |
|---|---|---|---|
| 7,810,733 B2 | 10/2010 | Silverbrook et al. | |
| 7,872,574 B2 | 1/2011 | Betts et al. | |
| 7,876,973 B2 | 1/2011 | Fairbanks et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 8,781,420 B2 | 7/2014 | Schlub et al. | |
| 8,825,112 B1 | 9/2014 | Fraden et al. | |
| 2002/0006337 A1 | 1/2002 | Kimura et al. | |
| 2002/0050518 A1* | 5/2002 | Roustaei | 235/454 |
| 2002/0058352 A1 | 5/2002 | Jacksen et al. | |
| 2002/0098859 A1* | 7/2002 | Murata | 455/522 |
| 2002/0122036 A1 | 9/2002 | Sasaki | |
| 2002/0135571 A1 | 9/2002 | Klocek et al. | |
| 2002/0140542 A1* | 10/2002 | Prokoski et al. | 340/5.52 |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0126593 A1* | 7/2003 | Mault | 725/10 |
| 2003/0214601 A1* | 11/2003 | Yuen | 348/375 |
| 2003/0223623 A1 | 12/2003 | Gutta et al. | |
| 2004/0047518 A1 | 3/2004 | Tiana | |
| 2004/0076316 A1 | 4/2004 | Fauci | |
| 2004/0090391 A1* | 5/2004 | Kondo | H04N 9/12 345/1.1 |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0135879 A1* | 7/2004 | Stacy et al. | 348/14.02 |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0183679 A1* | 9/2004 | Paximadis | G08B 13/19 340/567 |
| 2004/0207036 A1 | 10/2004 | Ikeda | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0068333 A1 | 3/2005 | Nakahashi et al. | |
| 2005/0089241 A1 | 4/2005 | Kawanishi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0047217 A1* | 3/2006 | Mirtalebi et al. | 600/534 |
| 2006/0060984 A1 | 3/2006 | Wakabayashi et al. | |
| 2006/0077246 A1 | 4/2006 | Kawakami et al. | |
| 2006/0088298 A1 | 4/2006 | Frame et al. | |
| 2006/0097172 A1 | 5/2006 | Park | |
| 2006/0099969 A1* | 5/2006 | Staton et al. | 455/456.4 |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0142940 A1* | 6/2006 | Choi | 701/210 |
| 2006/0147191 A1 | 7/2006 | Kim | |
| 2006/0154559 A1 | 7/2006 | Yoshida | |
| 2006/0210249 A1 | 9/2006 | Seto | |
| 2006/0232675 A1 | 10/2006 | Chamberlain et al. | |
| 2006/0234744 A1 | 10/2006 | Sung et al. | |
| 2006/0240867 A1 | 10/2006 | Wang et al. | |
| 2006/0279758 A1 | 12/2006 | Myoki | |
| 2006/0285907 A1 | 12/2006 | Kang et al. | |
| 2006/0289772 A1* | 12/2006 | Johnson | G01C 3/08 250/370.08 |
| 2007/0004449 A1 | 1/2007 | Sham | |
| 2007/0018919 A1 | 1/2007 | Zavracky et al. | |
| 2007/0019077 A1 | 1/2007 | Park | |
| 2007/0019099 A1 | 1/2007 | Lieberman et al. | |
| 2007/0019103 A1 | 1/2007 | Lieberman et al. | |
| 2007/0033309 A1 | 2/2007 | Kuwabara et al. | |
| 2007/0034800 A1 | 2/2007 | Huang | |
| 2007/0052616 A1 | 3/2007 | Yoon | |
| 2007/0057764 A1 | 3/2007 | Sato et al. | |
| 2007/0103479 A1 | 5/2007 | Kim et al. | |
| 2007/0120879 A1 | 5/2007 | Kanade et al. | |
| 2007/0132858 A1 | 6/2007 | Chiba et al. | |
| 2007/0139739 A1 | 6/2007 | Kim et al. | |
| 2007/0159524 A1 | 7/2007 | Kim et al. | |
| 2007/0183657 A1 | 8/2007 | Kidono et al. | |
| 2007/0189583 A1 | 8/2007 | Shimada et al. | |
| 2007/0211965 A1 | 9/2007 | Helbing et al. | |
| 2007/0222798 A1 | 9/2007 | Kuno | |
| 2007/0248284 A1 | 10/2007 | Bernsen et al. | |
| 2007/0274541 A1 | 11/2007 | Uetake et al. | |
| 2007/0285439 A1 | 12/2007 | King et al. | |
| 2007/0286517 A1 | 12/2007 | Paik et al. | |
| 2007/0299226 A1 | 12/2007 | Park et al. | |
| 2008/0038579 A1 | 2/2008 | Schuisky et al. | |
| 2008/0056612 A1 | 3/2008 | Park et al. | |
| 2008/0079834 A1 | 4/2008 | Chung et al. | |
| 2008/0099678 A1 | 5/2008 | Johnson et al. | |
| 2008/0112012 A1 | 5/2008 | Yokoyama et al. | |
| 2008/0151056 A1 | 6/2008 | Ahamefula | |
| 2008/0165190 A1 | 7/2008 | Min et al. | |
| 2008/0165342 A1 | 7/2008 | Yoshida et al. | |
| 2008/0170082 A1 | 7/2008 | Kim | |
| 2008/0218364 A1* | 9/2008 | Mizuo | 340/630 |
| 2008/0218474 A1 | 9/2008 | Ahn et al. | |
| 2008/0239091 A1 | 10/2008 | Soga | |
| 2008/0248833 A1 | 10/2008 | Silverbrook et al. | |
| 2008/0259181 A1 | 10/2008 | Yamashita et al. | |
| 2008/0266079 A1 | 10/2008 | Lontka | |
| 2008/0278772 A1 | 11/2008 | Silverbrook et al. | |
| 2008/0284880 A1 | 11/2008 | Numata | |
| 2008/0292144 A1 | 11/2008 | Kim | |
| 2008/0297614 A1 | 12/2008 | Lieberman et al. | |
| 2009/0002475 A1 | 1/2009 | Jelley et al. | |
| 2009/0023421 A1 | 1/2009 | Parkulo et al. | |
| 2009/0027525 A1 | 1/2009 | Lin et al. | |
| 2009/0040042 A1 | 2/2009 | Lontka | |
| 2009/0040195 A1 | 2/2009 | Njolstad et al. | |
| 2009/0052883 A1 | 2/2009 | Lee et al. | |
| 2009/0129700 A1 | 5/2009 | Rother et al. | |
| 2009/0131104 A1 | 5/2009 | Yoon | |
| 2009/0148019 A1 | 6/2009 | Hamada et al. | |
| 2009/0213110 A1 | 8/2009 | Kato et al. | |
| 2009/0215479 A1 | 8/2009 | Karmarkar | |
| 2009/0227287 A1 | 9/2009 | Kotidis | |
| 2009/0238238 A1 | 9/2009 | Hollander et al. | |
| 2009/0278048 A1 | 11/2009 | Choe et al. | |
| 2009/0297062 A1 | 12/2009 | Molne et al. | |
| 2009/0303363 A1 | 12/2009 | Blessinger | |
| 2010/0020229 A1 | 1/2010 | Hershey et al. | |
| 2010/0060448 A1* | 3/2010 | Larsen et al. | 340/539.15 |
| 2010/0061596 A1* | 3/2010 | Mostafavi et al. | 382/107 |
| 2010/0066866 A1 | 3/2010 | Lim | |
| 2010/0090965 A1 | 4/2010 | Birkler | |
| 2010/0090983 A1 | 4/2010 | Challener et al. | |
| 2010/0103141 A1 | 4/2010 | Challener et al. | |
| 2010/0113068 A1 | 5/2010 | Rothschild | |
| 2010/0131268 A1 | 5/2010 | Moeller | |
| 2010/0144387 A1 | 6/2010 | Chou | |
| 2010/0163730 A1 | 7/2010 | Schmidt et al. | |
| 2010/0191124 A1 | 7/2010 | Prokoski | |
| 2010/0234067 A1 | 9/2010 | Silverbrook et al. | |
| 2010/0245582 A1 | 9/2010 | Harel | |
| 2010/0245585 A1 | 9/2010 | Fisher et al. | |
| 2010/0245826 A1 | 9/2010 | Lee | |
| 2010/0314543 A1 | 12/2010 | Lee et al. | |

(56) References Cited

U.S. PATENT DOCUMENTS

| | | |
|---|---|---|
| 2011/0043486 A1 | 2/2011 | Hagiwara et al. |
| 2011/0063446 A1 | 3/2011 | McMordie et al. |
| 2011/0063451 A1 | 3/2011 | Kamon et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0075462 A1* | 3/2012 | Chen et al. ............ 348/135 |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0124039 A1* | 5/2013 | Abreu ..................... 701/36 |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 101226635 | 7/2008 |
| CN | 201203922 | 3/2009 |
| CN | 101404084 | 4/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0973137 | 1/2000 |
| EP | 1811711 | 7/2007 |
| EP | 1983485 | 10/2008 |
| EP | 2136554 | 12/2009 |
| EP | 2 460 469 | 11/2011 |
| EP | 2477391 | 7/2012 |
| GB | 2442512 | 4/2008 |
| JP | 1997275518 | 4/1999 |
| JP | 2004004465 | 1/2004 |
| JP | 2004048571 | 2/2004 |
| JP | 2004241491 | 8/2004 |
| JP | 2006098098 | 4/2006 |
| JP | 2006105655 | 4/2006 |
| JP | 2007006475 | 1/2007 |
| JP | 2007267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |

(56) References Cited

FOREIGN PATENT DOCUMENTS

| | | |
|---|---|---|
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 01/82593 | 11/2001 |
| WO | WO 03/093963 | 11/2003 |
| WO | WO 2004/070449 | 8/2004 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/008778 | 1/2009 |
| WO | WO 2009/122114 | 10/2009 |
| WO | WO 2010/005152 | 1/2010 |
| WO | WO 2010/033142 | 3/2010 |
| WO | WO 2011/151806 | 12/2011 |

OTHER PUBLICATIONS

Hao et al., "An Infrared Image Fusion Algorithm Based on Lifting Wavelet Transform", Laser & Infrared, Jan. 31, 2009, vol. 39, No. 1, pp. 97-100.

Yan Jixiang, "Infrared Image Sequence Enhancement Based on Wavelet Transform", Full-Text Database of China Excellent Master Degree Thesis, Information Technology Collection, Jan. 15, 2009, No. 01, pp. 1-69.

Gangkofner, Ute G. et al., "Optimizing the High-Pass Filter Addition Technique for Image Fusion," Photogrammetric Engineering & Remote Sensing, vol. 74, No. 9, Sep. 1, 2008, pp. 1107-1118.

Ager, Thomas P. et al., "Geo-positional Accuracy Evaluation of QuickBird Ortho-Ready Standard 2A Multispectral Imagery," Algorithms and Technologies for Multispectral, Hyperspectral, and Ultraspectral Imagery X, vol. 5425, Aug. 12, 2004, pp. 488-499.

Alpha compositing, http://en.wikipedia.org/wiki/Alpha_compositing, printed Feb. 4, 2010, 4 pages.

Toshihiro Horie, Alpha Blending Tutorial, http://www.ocf.berkeley.edu/~horie/alphablend.html, Jan. 21, 2002, 4 pages.

Sony, XIS-5400 XIS-5310 XIS-CM543 XIS-SR500, Wide Aread Monitoring Solutions, brochure published by Sony Corporation, 2008, 8 pages.

Fluke, New! Fluke Ti25 and Ti10 Thermal Imagers, brochure published by Fluke Corporations, 2008, 5 pages.

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

* cited by examiner

INFANT MONITORING SYSTEMS AND METHODS USING THERMAL IMAGING

CROSS-REFERENCE TO RELATED APPLICATIONS

This application claims the benefit of U.S. Provisional Patent Application No. 61/670,824 filed Jul. 12, 2012 and entitled "INFANT MONITORING SYSTEMS AND METHODS USING THERMAL IMAGING" which is hereby incorporated by reference in its entirety.

This application claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

This application claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

This application claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

This application claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

This application claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

This application is a continuation-in-part of U.S. patent application Ser. No. 12/477,828 filed Jun. 3, 2009 and entitled "INFRARED CAMERA SYSTEMS AND METHODS FOR DUAL SENSOR APPLICATIONS" which is hereby incorporated by reference in its entirety.

This application is a continuation-in-part of U.S. patent application Ser. No. 13/437,645 filed Apr. 2, 2012 and entitled "INFRARED RESOLUTION AND CONTRAST ENHANCEMENT WITH FUSION" which is a continuation-in-part of U.S. patent application Ser. No. 13/105,765 filed May 11, 2011 and entitled "INFRARED RESOLUTION AND CONTRAST ENHANCEMENT WITH FUSION" which is a continuation of International Patent Application No. PCT/EP2011/056432 filed Apr. 21, 2011 and entitled "INFRARED RESOLUTION AND CONTRAST ENHANCEMENT WITH FUSION", all of which are hereby incorporated by reference in their entirety.

International Patent Application No. PCT/EP2011/056432 claims the benefit of U.S. Provisional Patent Application No. 61/473,207 filed Apr. 8, 2011 and entitled "INFRARED RESOLUTION AND CONTRAST ENHANCEMENT WITH FUSION", which is hereby incorporated by reference in its entirety.

International Patent Application No. PCT/EP2011/056432 is a continuation-in-part of U.S. patent application No. 12/766,739 filed Apr. 23, 2010 and entitled "INFRARED RESOLUTION AND CONTRAST ENHANCEMENT WITH FUSION", which is hereby incorporated by reference in its entirety.

U.S. patent application Ser. No. 13/437,645 is a continuation-in-part of U.S. patent application Ser. No. 12/766,739 filed Apr. 23, 2010 and entitled "INFRARED RESOLUTION AND CONTRAST ENHANCEMENT WITH FUSION", which is hereby incorporated by reference in its entirety.

U.S. patent application Ser. No. 13/437,645 claims the benefit of U.S. Provisional Patent Application No. 61/473,207 filed Apr. 8, 2011 and entitled "INFRARED RESOLUTION AND CONTRAST ENHANCEMENT WITH FUSION", which is hereby incorporated by reference in its entirety.

U.S. patent application Ser. No. 13/105,765 is a continuation-in-part of U.S. patent application Ser. No. 12/766,739 filed Apr. 23, 2010 and entitled "INFRARED RESOLUTION AND CONTRAST ENHANCEMENT WITH FUSION", which is hereby incorporated by reference in its entirety.

This application is a continuation-in-part of U.S. patent application Ser. No. 13/105,765 filed May 11, 2011 and entitled "INFRARED RESOLUTION AND CONTRAST ENHANCEMENT WITH FUSION", which is hereby incorporated by reference in its entirety.

This application is a continuation-in-part of U.S. patent application No. 12/766,739 filed Apr. 23, 2010 and entitled "INFRARED RESOLUTION AND CONTRAST ENHANCEMENT WITH FUSION", which is hereby incorporated by reference in its entirety.

This application is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON- UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to thermal imaging devices and more particularly, for example, to the use of thermal images to provide monitoring of an infant, an elderly person, a patient, or other persons who may need observation.

BACKGROUND

Devices for monitoring an infant are currently available. However, most conventional infant monitors are little more than remote viewing and/or listening devices, using visible light image sensors (e.g., CMOS-based or CCD-based sensors) and/or microphones to passively provide images and/or sound of an infant to a caregiver. As such, these conventional infant monitors require the caregiver to keep a constant eye and ear on the monitor for any unusual condition or activity of the infant, which is practically impossible. Furthermore, even if the caregiver stands in a constant vigil in front of the monitor, it may still be very difficult, if not impossible, to detect abnormal conditions that may lead to death, injury, or other serious harm to the infant. For example, abnormal breathing patterns, including apnea, are a symptom as well as a cause of sudden infant death syndrome (SIDS), but abnormal breathing patterns are difficult to recognize through video images of the infant. In another example, while an abnormal body temperature may be a sign of serious illness that requires immediate attention, no temperature reading can be obtained through conventional video images.

While some conventional solutions may be available for limited active monitoring that detects movement, heartbeat, or temperature, these conventional solutions are based on techniques that require contact. That is, these solutions require patches and/or electrodes in direct contact with the body of the infant, patches and/or electrodes in diapers or clothes, sensor pads on mattresses, or other sensors in direct or indirect contact with the infant to detect temperature, movement, or heartbeat. Thus, contact-based solutions may not only be inconvenient but also restrict the choice of the monitoring location (e.g., only on a bed or in a crib).

Yet another disadvantage of conventional infant monitors is that active illumination is required for viewing at nighttime or other low light situations. Actively illuminated images of the infant are often washed out if the infant is close to the light source, and too dimly lit if the infant is far from the light source. Furthermore, light sources may add bulk to a camera module of infant monitors and quickly drain power sources (e.g., batteries), thereby limiting the portability of infant monitors.

SUMMARY

Various techniques are disclosed for systems and methods using thermal imaging to monitor an infant, an elderly person, a patient, or other persons that may need observation. For example, an infant monitoring system may include an infrared imaging module, a visible light camera, a processor, a display, a communication module, and a memory. The monitoring system may capture thermal images of a scene including at least a partial view of an infant, using the infrared imaging module enclosed in a portable or mountable housing configured to be positioned for remote monitoring of the infant. Various thermal image processing and analysis operations may be performed on the thermal images to generate monitoring information relating to the infant. The monitoring information may include various alarms that actively provide warnings to caregivers, and user-viewable images of the scene. The monitoring information may be presented at external devices or the display located remotely for convenient viewing by caregivers.

In one embodiment, a monitoring system includes an infrared imaging module comprising a focal plane array (FPA) configured to capture thermal images of a scene within a field of view (FOV) of the infrared imaging module; a housing substantially enclosing the infrared imaging module and configured to be positioned to place at least a portion of an infant within the FOV; and a processor in communication with the infrared imaging module, the processor configured to analyze the thermal images to generate monitoring information relating to the infant.

In another embodiment, a method includes capturing, at an FPA of an infrared imaging module, thermal images of a scene within an FOV of the infrared imaging module, wherein the infrared imaging module is positioned so that at least a portion of an infant is placed within the FOV of the infrared imaging module; and analyzing the thermal images to generate monitoring information relating to the infant.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
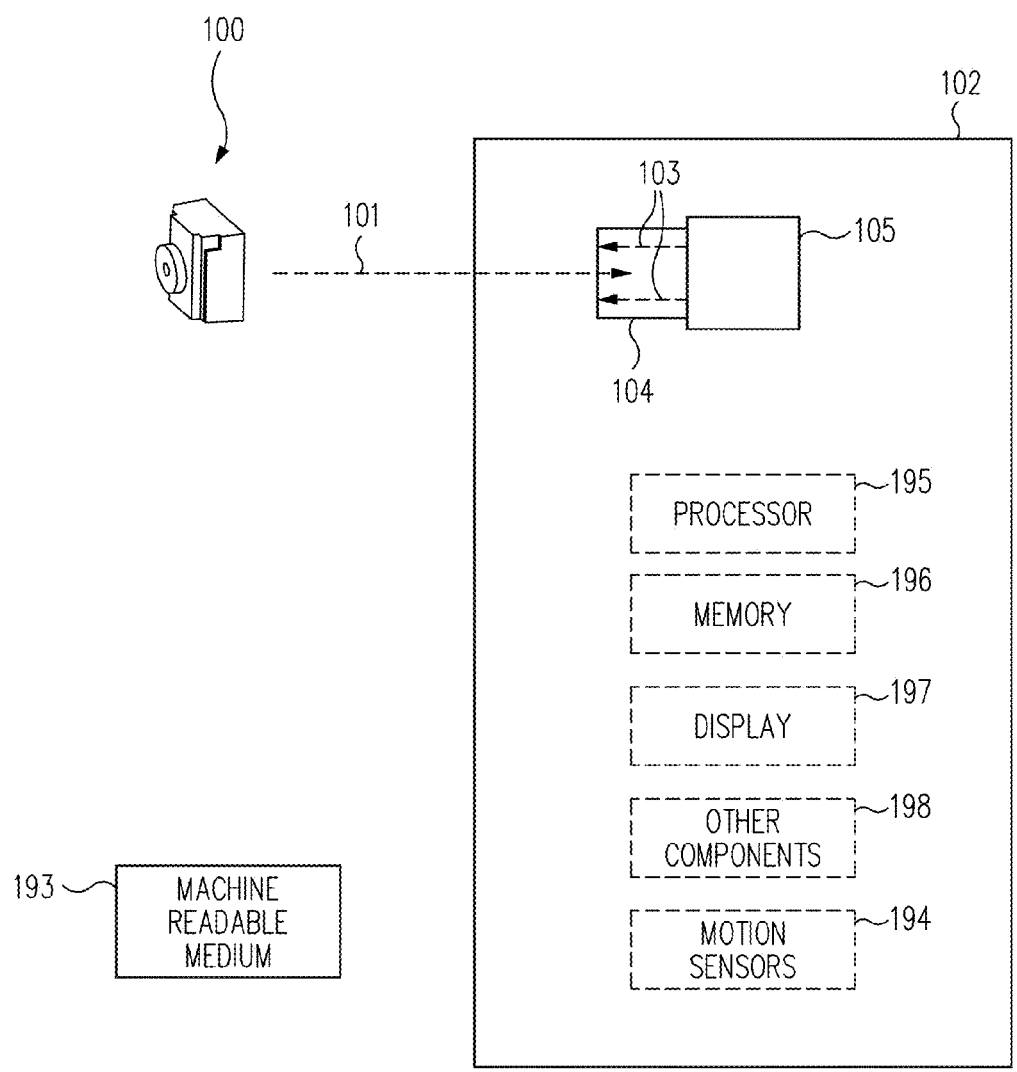
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
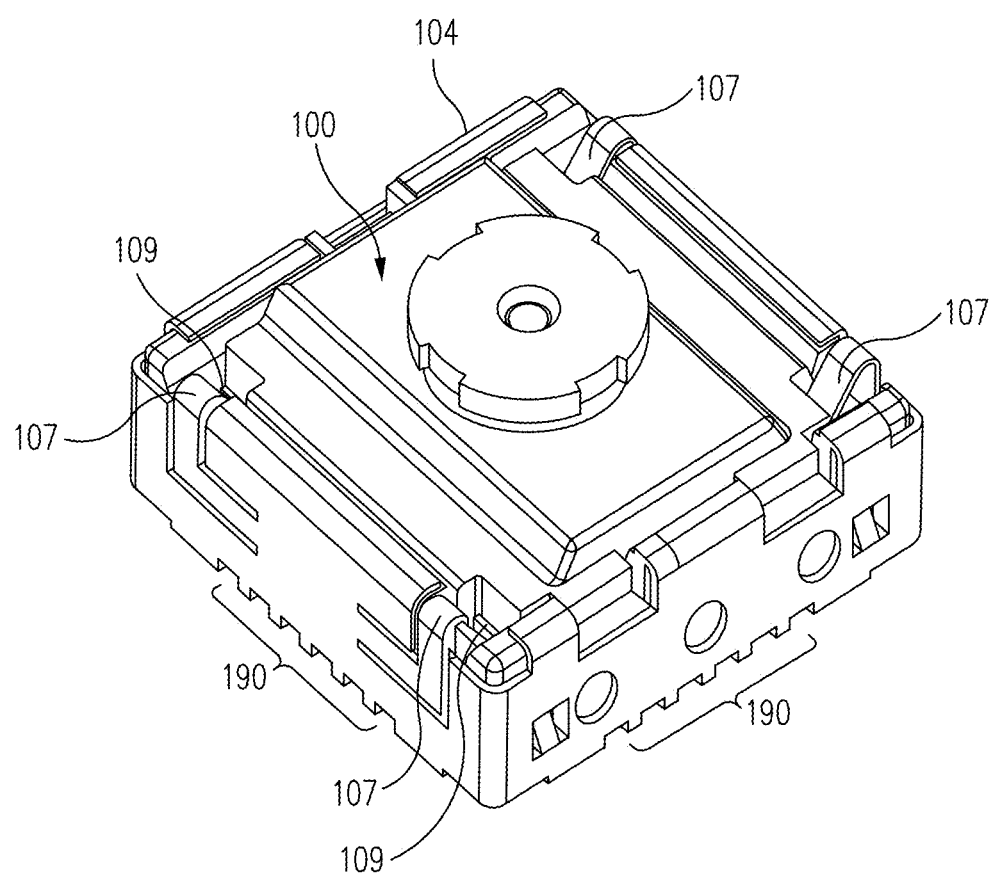
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
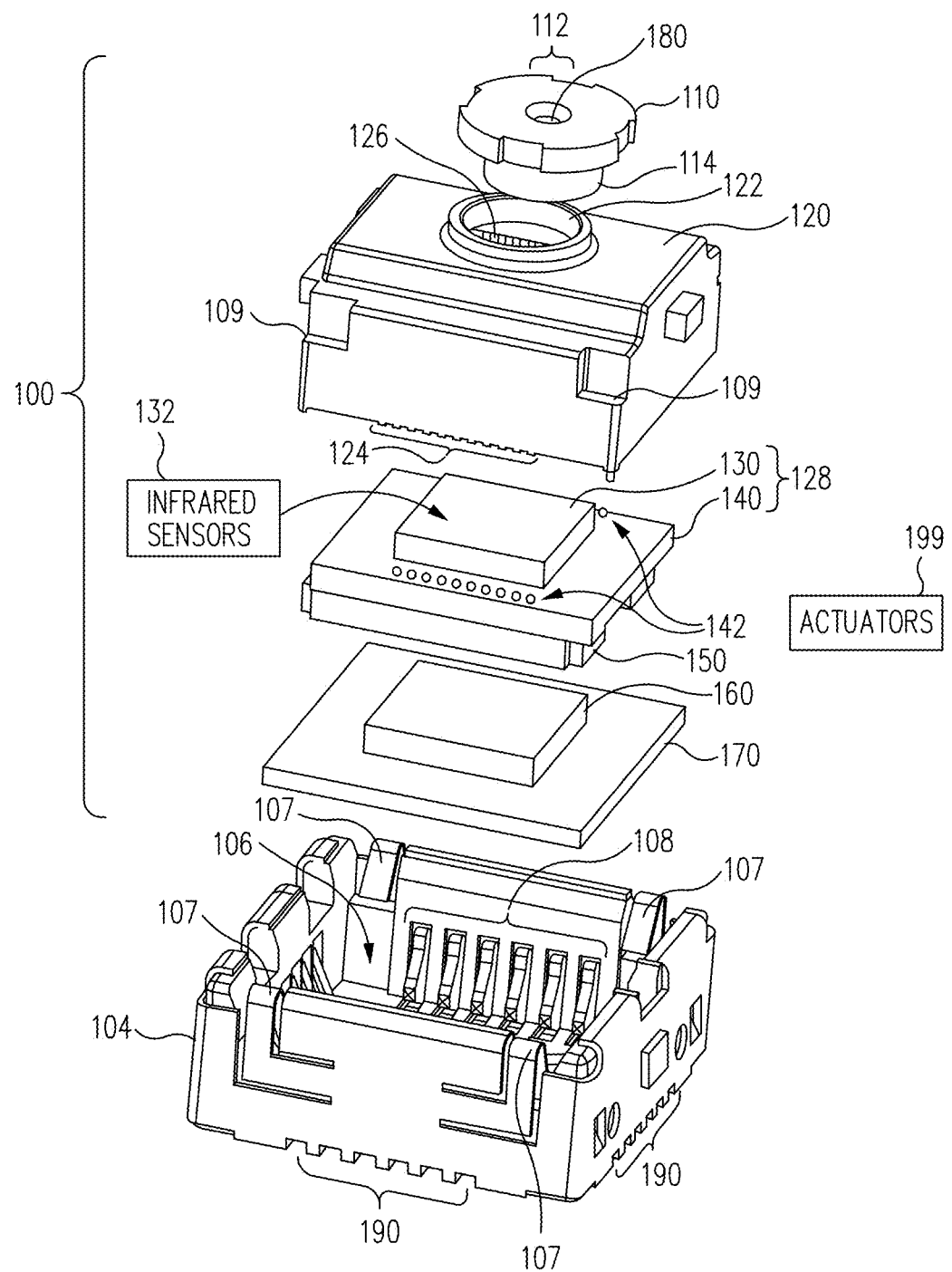
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
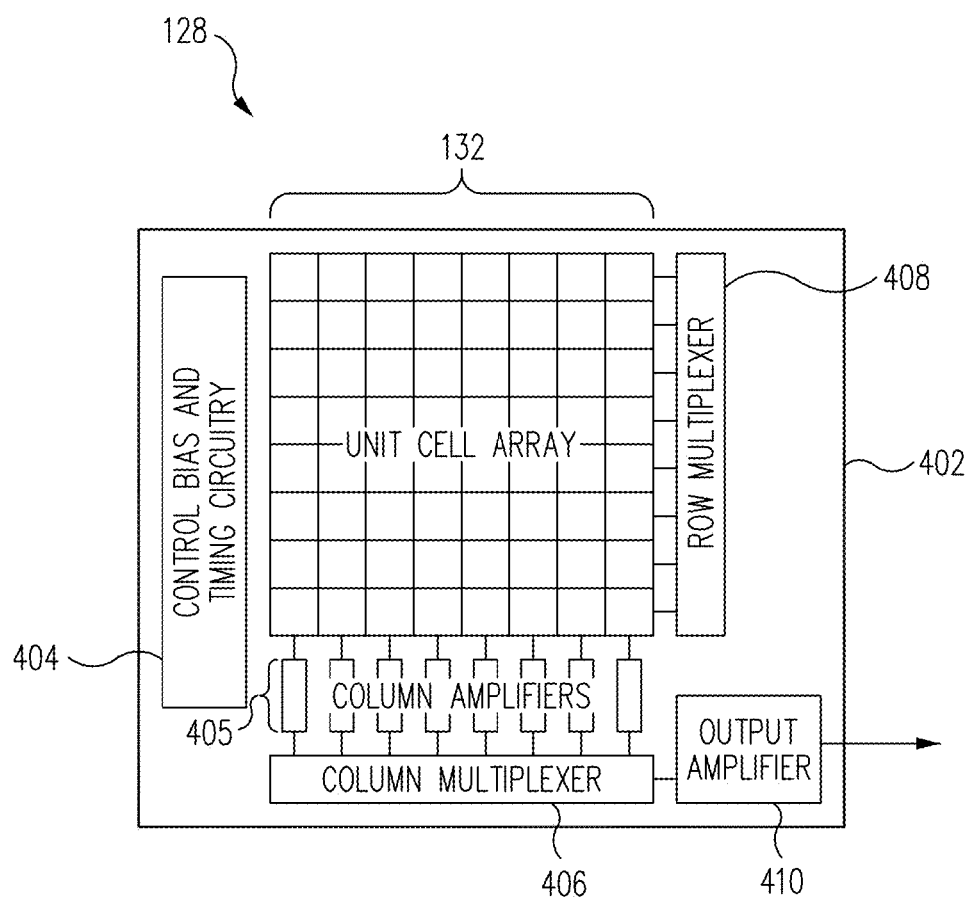
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No.

6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
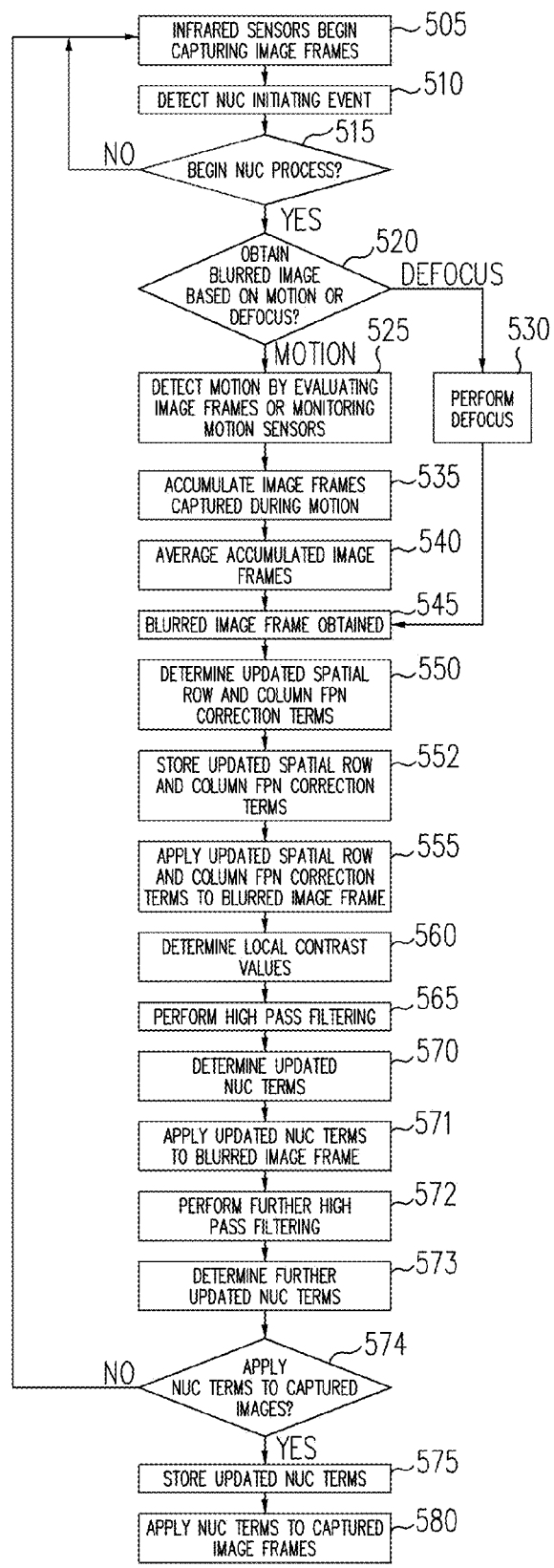
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
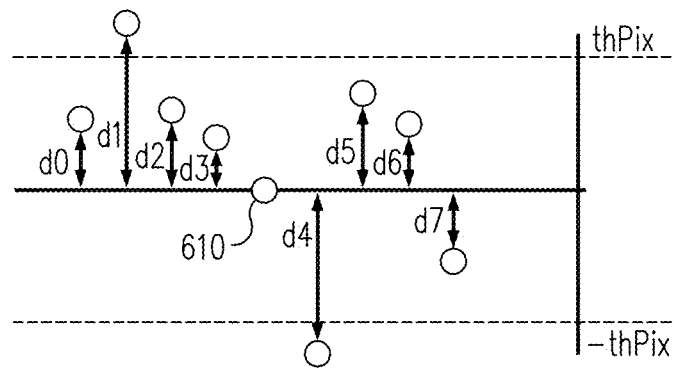
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
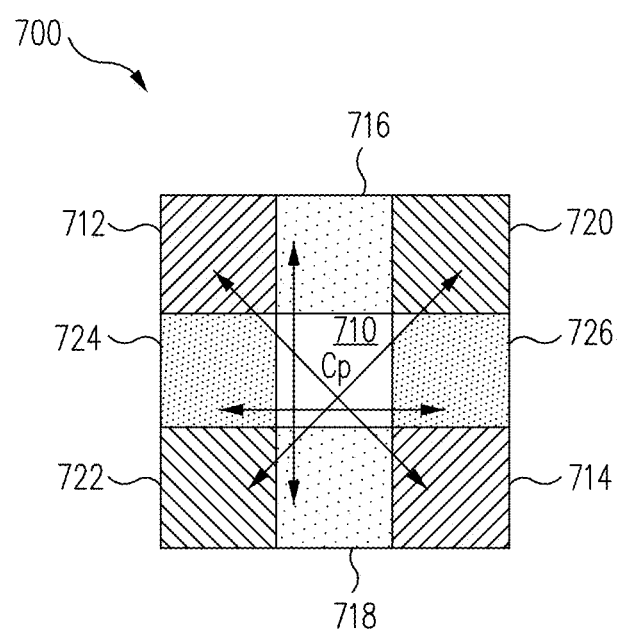
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028, 309 issued Feb. 22, 2000, U.S. Pat. No. 6,812,465 issued Nov. 2, 2004, and U.S. patent application Ser. No. 12/114, 865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
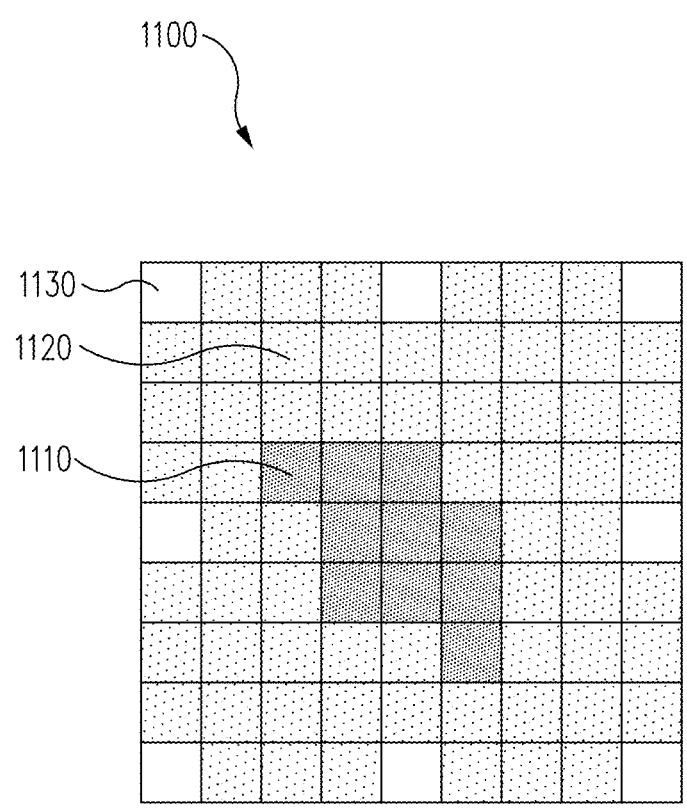
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in block 573.

In various embodiments, blocks 571-573 may be repeated (e.g., cascaded) to iteratively perform high pass filtering with increasing kernel sizes to provide further updated NUC teens further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
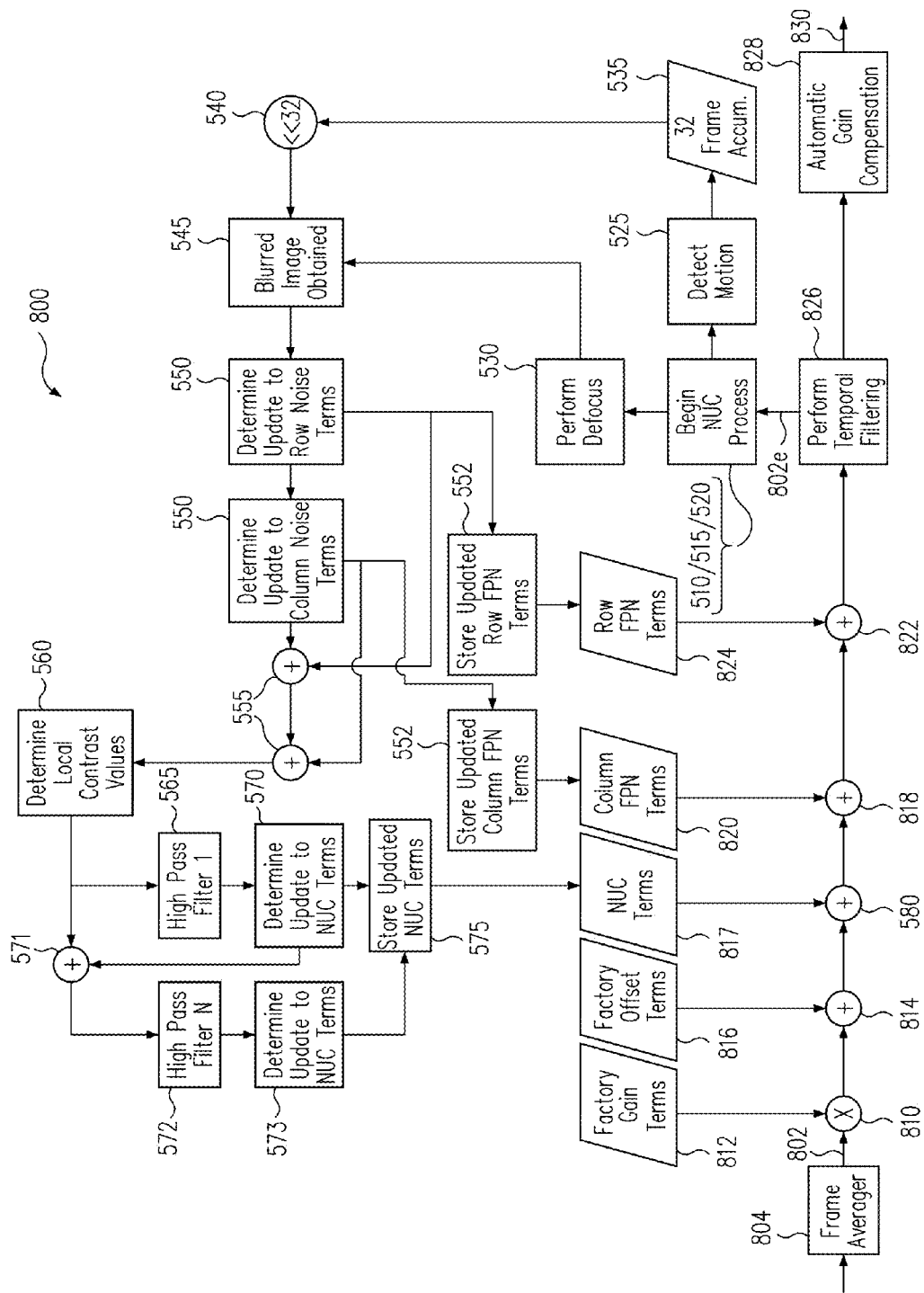
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
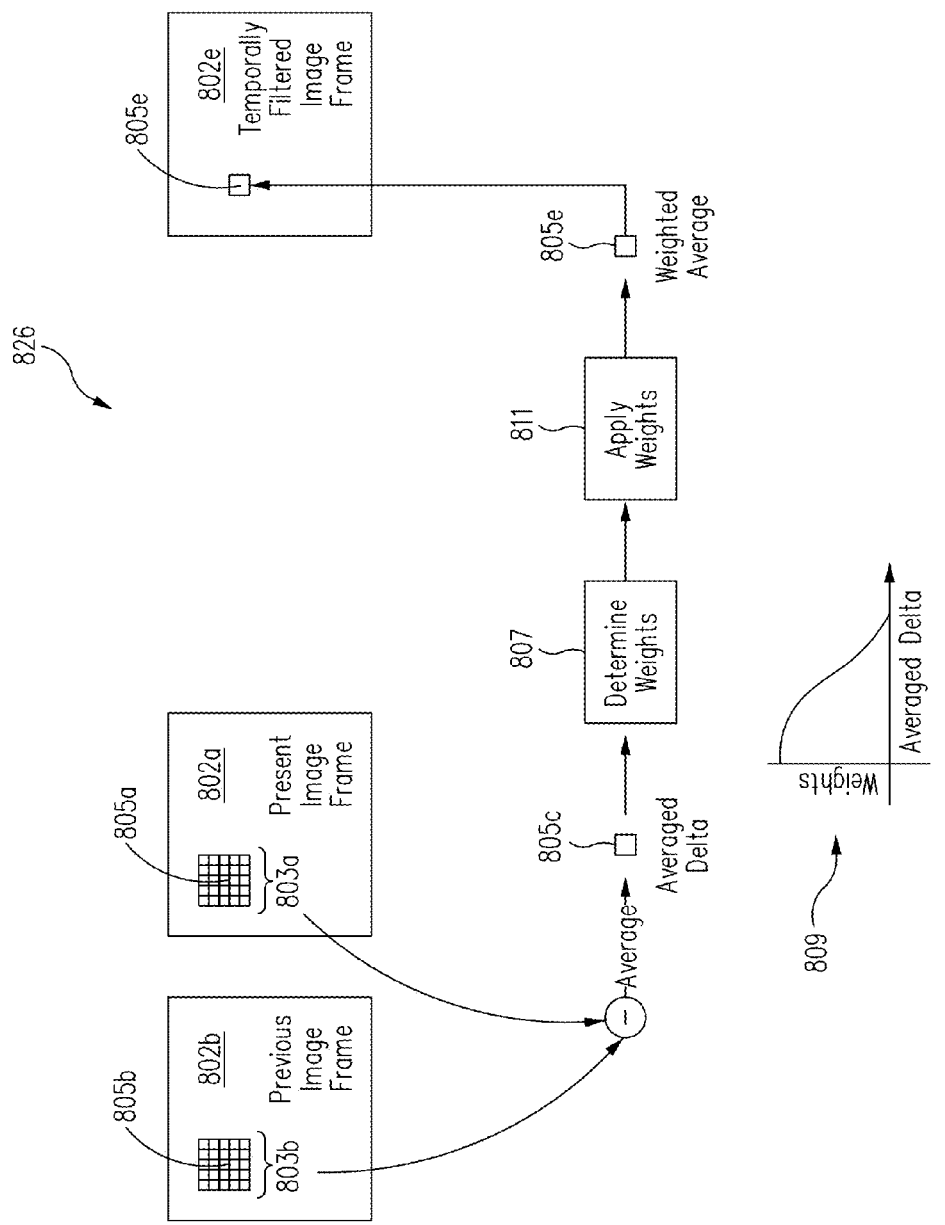
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
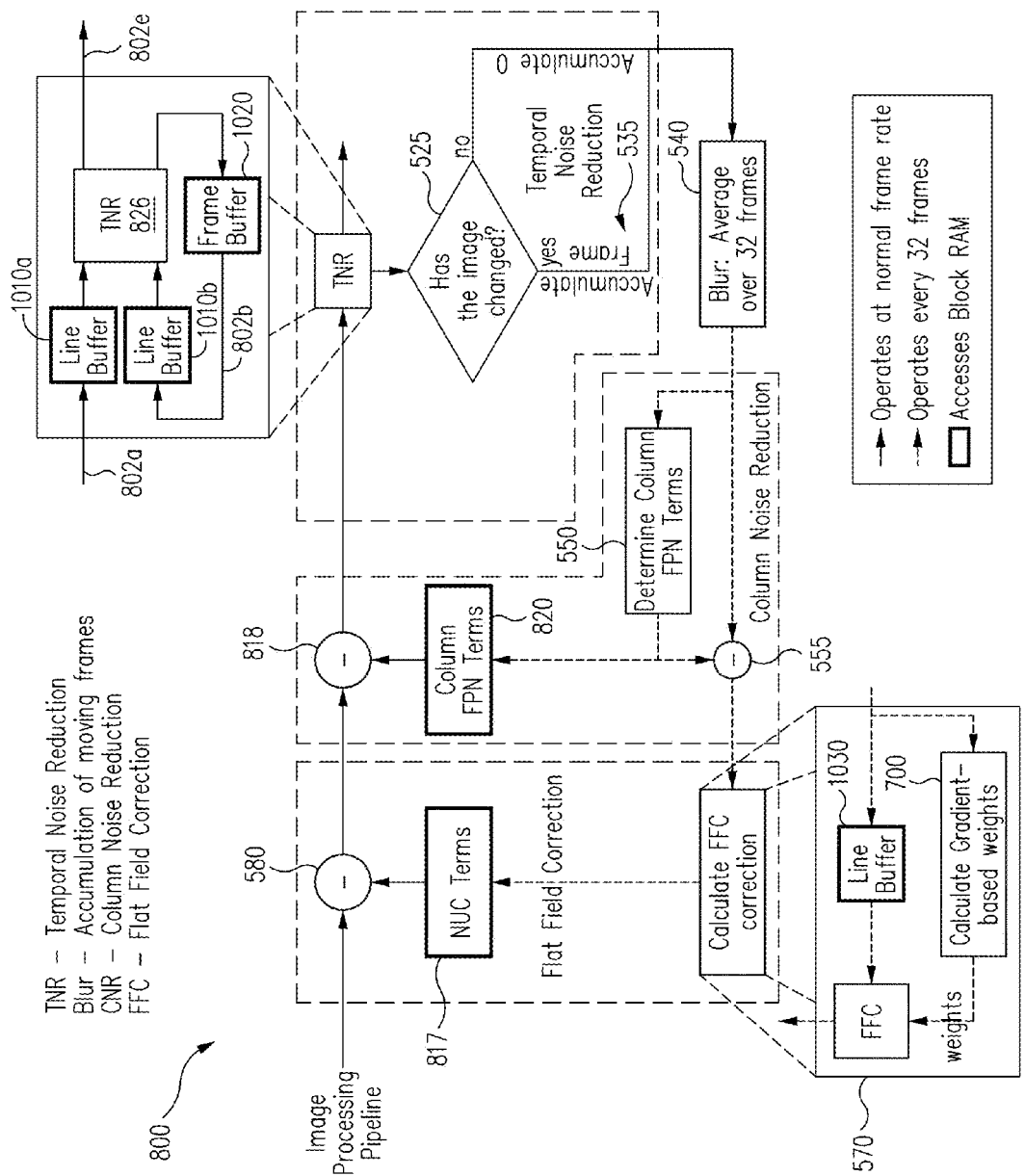
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is $\frac{1}{32}$ of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
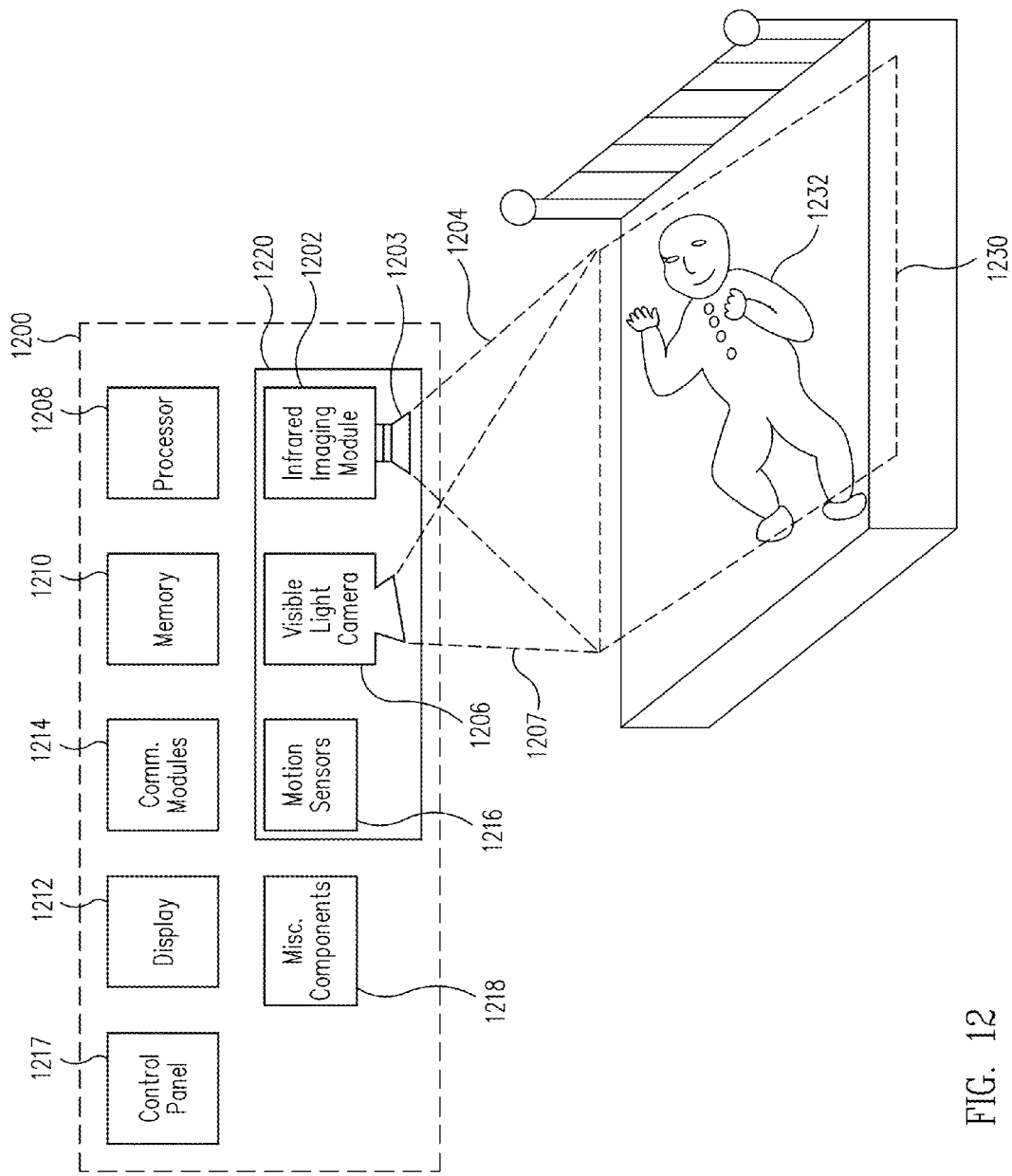
FIG. 12 illustrates a block diagram of an infant monitoring system having an infrared imaging module in accordance with an embodiment of the disclosure.

Referring now to FIG. 12, a block diagram is shown of an infant monitoring system 1200 having an infrared imaging module 1202 in accordance with an embodiment of the disclosure. While an infant 1232 is depicted in this and other examples of the disclosure as a baby or young child, it will be appreciated that systems and methods disclosed herein may be used to monitor older children, elderly persons, patients, or any other person for whom monitoring or observation may be required and/or desired. Thus, an "infant" in the present disclosure should be interpreted to include all and any such persons, and infant monitoring system 1200 may be utilized in any other suitable setting such as in a nursing home for the elderly or in a hospital.

Monitoring system 1200 may include infrared imaging module 1202, a visible light camera 1206, a processor 1208, a memory 1210, a communication module 1212, a display 1214, motion sensors 1216, a control panel 1217, and/or miscellaneous components 1218. In various embodiments, components of system 1200 may be implemented in the same or similar manner as corresponding components of host device 102 of FIG. 1. Moreover, components of system 1200 may be configured to perform various NUC processes and other processes described herein.

In various embodiments, infrared imaging module 1202 may be a small form factor infrared camera or a small form factor infrared imaging device implemented in accordance with various embodiments disclosed herein. Infrared imaging module 1202 may include an FPA implemented, for example, in accordance with various embodiments disclosed herein or others where appropriate.

Infrared imaging module 1202 may be configured to capture, process, and/or otherwise manage infrared images (e.g., including thermal images) of a scene 1230 that comprises at least a partial view of infant 1232. In this regard, infrared imaging module 1202 may be attached, mounted, installed, or otherwise disposed at any suitable location that allows at least a portion of infant 1232 to be placed within a field of view (FOV) 1204 of infrared imaging module 1202. For example, infrared imaging module 1202 may be adjustably attached to a wall, a bed rail, a headboard, a crib barrier, a frame of a stroller, a car seatback, or any suitable part of any structure or piece of furniture as needed to at least partially place infant 1232 within FOV 1204.

Infrared imaging module 1202 may be housed in a housing 1220 which in some embodiment comprises clamps, clips, suction cups, or other suitable attachment mechanisms to releasably attach housing 1220, and hence infrared imaging module 1202, to a suitable location as listed above. In some embodiments, housing 1220 may be fixedly attached to a suitable location with an appropriate fastener. In some embodiments, housing 1220 may comprise a stand that allows housing 1220 to be placed on a table top or any other substantially horizontal surfaces. In some embodiments, the housing may comprise at least one articulable joint or other similar mechanism for further adjusting the position, orientation, and/or angle of infrared imaging module 1202 housed within it. Thus, in various embodiments the housing may be configured for suitably positioning infrared imaging module 1202 to at least partially place infant 1232 within FOV 1204.

In some embodiments, infrared imaging module 1202 may include various optical elements 1203 (e.g., infrared-transmissive lens, infrared-transmissive prisms, infrared-reflective mirrors, infrared fiber optics) that guide infrared radiation from scene 1230 to an FPA of infrared imaging module 1202. Optical elements 1203 may be useful when it is difficult to mount infrared imaging module 1202 at a desired angle and/or location. For example, if there is little or no room for mounting infrared imaging module 1202 at a desired location in an incubator for premature babies, a flexible fiber-optic cable and lens may be utilized to route infrared radiation to infrared imaging module 1202 mounted elsewhere. Note also that optical elements 1203 may be used to suitably define or alter FOV 1205 of infrared imaging module 1202. A switchable FOV (e.g., selectable by infrared imaging module 1202 and/or processor 1204) may optionally be provided, which may be useful when, for example, a selective close-up view of the facial area of infant 1232 is desired.

Optical elements 1203 may also include one or more filters adapted to pass infrared radiation of certain wavelengths but substantially block off others (e.g., short-wave infrared (SWIR) filters, mid-wave infrared (MWIR) filters, long-wave infrared (LWIR) filters, and narrow-band filters). Such filters may be utilized to tailor infrared imaging module 1202 for increased sensitivity to a desired band of infrared wavelengths. For example, when detecting exhaled breaths of infant 1232 as further described herein, a better result may be achieved by utilizing a narrow-band filter that transmits only in the wavelengths matching a specific absorption/emission spectrum of carbon dioxide ($CO_2$) or other constituent gases of an exhaled breath. In some embodiments, filters may be selectable (e.g., provided as a selectable filter wheel). In other embodiments, filters may be fixed as appropriate for a desired application of monitoring system 1200.

Infrared images captured, processed, and/or otherwise managed by infrared imaging module 1202 may be radiometrically normalized infrared images (e.g., thermal images). That is, pixels that make up the captured image may contain calibrated thermal data (e.g., temperature). As discussed above in connection with infrared imaging module 100 of FIG. 1, infrared imaging module 1202 and/or associated components may be calibrated using appropriate techniques so that images captured by infrared imaging module 1202 are properly calibrated thermal images. In some embodiments, appropriate calibration processes may be performed periodically by infrared imaging module 1202 and/or processor 1208 so that infrared imaging module 1202, and hence the thermal images captured by it, may maintain proper calibration.

Radiometric normalization permits infrared imaging module 1202 and/or processor 1208 to efficiently detect, from thermal images, objects having a specific range of temperature. Infrared imaging module 1202 and/or processor 1208 may detect such objects efficiently and effectively, because thermal images of objects having a specific temperature may be easily discernible from a background and other objects, and yet less susceptible to lighting conditions or obscuring (e.g., obscured by clothing). In contrast, object detection operations performed on visible light images (e.g., images captured by CMOS or CCD sensors) or non-normalized infrared images, such as performing edge detection and/or pattern recognition algorithms on such images, may be computationally complex yet ineffective.

For example, in one embodiment, infrared imaging module 1202 and/or processor 1208 may be configured to detect from thermal images a contiguous region of pixels (also referred to as a "blob" or "warm blob") having a temperature approximately in the range of a clothed infant, for example, between approximately 75° F. (e.g., clothed part of a body) and approximately 110° F. (e.g., exposed part of a body such as a face and hands). Such a "warm blob" may indicate a presence of an infant (e.g., infant 1232) in scene 1230, and may be analyzed further as described herein to ascertain the presence of the infant, track the facial area of the infant, and determine various attributes associated with the infant.

Visible light camera 1206 may be a small form factor visible light imaging module or imaging device, and may be implemented in a similar manner as various embodiments of infrared imaging module 1202 disclosed herein, but with one or more sensors responsive to visible light (e.g., radiation in the visible spectrum). For example, in some embodiments, visible light camera 1206 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other sensors. In some embodiments, visible light images captured by visible light camera 1206 may be received by processor 1208, which may be configured to fuse, superimpose, or otherwise combine the visible light images with the thermal images captured by infrared imaging module 1202 as further described herein.

In some embodiments, visible light camera 1206 may be co-located with infrared imaging module 1202 in housing 1220 and oriented so that an FOV 1207 of visible light camera 1206 at least partially overlaps FOV 1204 of infrared imaging module 1202. In one example, infrared imaging module 1202 and visible light camera 1206 may be implemented as a dual sensor module sharing a common substrate according to various techniques described in U.S. Provisional Patent Application No. 61/748,018 previously referenced herein. Such a dual sensor module implementation may include common circuitry and/or common restraint devices for infrared imaging and visible light imaging, thereby potentially reducing an overall size of infant monitoring system 1200 as compared to embodiments where infrared imaging module 1202 and visible light camera 1206 are implemented as individual modules. Additionally, the dual sensor module implementation may be adapted to reduce a parallax error between images captured by infrared imaging module 1202 and visible light camera 1206 by spacing them closer together.

Processor 1208 may be implemented as any appropriate processing device as described with regard to processor 195 in FIG. 1. In some embodiments, at least some part or some functionalities of processor 1208 described herein may be implemented as part of infrared imaging module 1202, for example, at processing module 160 described above in connection with FIG. 1. In some embodiments, at least some part or some functionalities of processor 1208 may be part of or implemented with other existing processors of an external device such as a mobile phone, a tablet device, a laptop computer, a desktop computer, an automobile information display system, or any other devices that may be used to present monitoring information from monitoring system 1200. In other embodiments, processor 1208 may interface and communicate with such other external processors and components associated with such processors.

Processor 1208 may be configured to interface and communicate with other components of monitoring system 1200 to perform various processing and analysis operations described herein. Processor 1208 may be configured to receive thermal images captured by infrared imaging module 1202. Processor 1208 may be configured to perform, on the received thermal images of a scene (e.g., scene 1230) including at least a partial view of an infant (e.g., infant 1232), various thermal image processing and analysis operations as further described herein, for example, to detect and track the infant, and determine various attributes associated with the infant. Processor 1208 may be configured to collect, compile, analyze, or otherwise process the outcome of the thermal image processing and analysis operations to generate monitoring information regarding the infant.

In one example, processor 1208 may be configured to determine whether the infant is breathing normally or not, and generate an alarm upon determining that the infant is not breathing normally (e.g., indicating a pattern of apnea, hyperventilation, or other abnormal breathing patterns). In this regard, processor 1208 may be configured to detect and track the face and facial features of the infant in the thermal images according to one or more embodiments of the disclosure.

Figure 13:
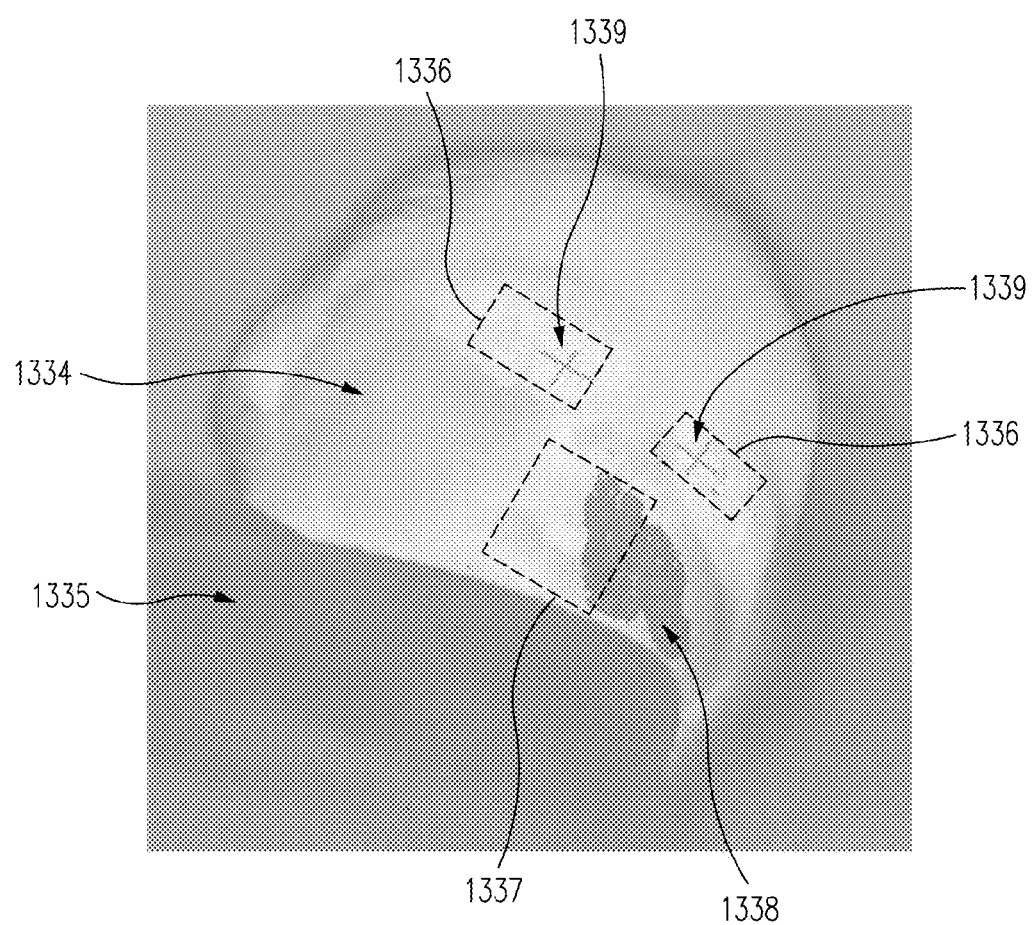
FIG. 13 illustrates an example thermal image of an infant that may be captured by an infrared imaging module and analyzed by a processor in accordance with an embodiment of the disclosure.

Also referring to FIG. 13, an example thermal image (shown as a user-viewable thermal image for ease of understanding, with lighter portions representing higher temperatures) that may be captured by infrared imaging module 1202 is shown. As this example thermal image shows, a face 1334 of an infant generally exhibits a higher temperature than a covered body 1335 or a background. Furthermore, facial features such as the eyes, mouth, and nostrils generally exhibit even higher temperatures. Thus, a face (e.g., face 1334), and more specifically the eyes, nose, and mouth (e.g., eye regions 1336, tear duct regions 1339, and an oronasal region 1337), may be accurately and yet efficiently differentiated and tracked using appropriate detection and tracking operations described herein and elsewhere.

In other embodiments, if visible light images captured by visible light camera 1206 are available, processor 1208 may be configured to track the face and facial features based additionally or alternatively on the visible light images. For example, the visible light images may provide more detail and contrast than the thermal images in certain ambient light conditions, and thus may be analyzed using suitable face tracking algorithms in such favorable light conditions. In another example, both the visible light images and the thermal images may be analyzed to complementarily increase detection and tracking accuracy. In another example, the thermal images and the visible light images may be combined or fused as further described herein, and the combined or fused images may be analyzed to track the face and facial features. If processor 1208 is configured to detect and track the face and facial features using the visible light images, processor 1208 may be further configured to convert pixel coordinates of the tracked face and facial features in the visible light images to corresponding pixel coordinates in the thermal images.

Whether or not the infant is breathing normally may be determined by analyzing the thermal images to detect exhaled breaths of the infant and analyzing the intervals between the detected exhalation, according to an embodiment of the disclosure. In this embodiment, processor 1208 may be configured to detect a presence of exhaled breaths 1338 in or near oronasal region 1337 being tracked. Exhaled breaths 1338 may appear in the thermal images for a short period after each exhalation, and may be detectable as a distinct plume of gas rich in $CO_2$ and having a temperature slightly lower than the body temperature. Thus, by analyzing tracked oronasal region 1337 for presence of a group of pixels having radiometric properties characteristic of such gases, exhaled breaths 1338 may be detected. Moreover, as discussed above in connection with optical elements 1203 of infrared imaging module 1202, narrow-band filters may be utilized in some embodiments, so that infrared radiation absorbed and emitted by $CO_2$ may be shown more clearly and in higher contrast to infrared radiation from other substances for an improved detection of exhaled breaths 1338. Processor 1208 may be configured to generate an alarm when, for example, no exhalation is detected for a certain period of time (e.g., indicative of apnea), the interval between the detected exhalations is too long (e.g., indicative of apnea), or the interval between the detected exhalations is too short (e.g., indicative of hyperventilation).

In another embodiment, processor 1208 may be configured to detect breathing by analyzing tracked oronasal region 1337 to detect periodic variations in the temperature and/or shape of oronasal region 1337. For example, processor 1208 may be configured to detect periodic alteration of slightly higher and lower temperatures in the nostrils and/or periodic movement of oronasal region 1337, which may be indicative of periodic inhalation and exhalation cycles. It is also contemplated that processor 1208 may be configured to detect breathing by performing other suitable analysis and/or processing operations, for example, for detecting various periodic variations indicative of breathing. In various embodiments, processor 1208 may be configured to detect breathing by performing any combination of breathing detection operations described herein.

In another example, monitoring information that may be generated by processor 1208 includes an approximate body temperature of an infant and/or an alarm to warn of abnormal body temperature. As described above, processor 1208 may be configured to locate and track the face of an infant in the thermal images by analyzing the thermal images, visible light images, and/or combined thermal-visible light images. In one embodiment, processor 1208 may be configured to determine an approximate body temperature by aggregating, averaging, and/or otherwise analyzing the radiometric data (e.g., temperature data) associated with thermal image pixels that correspond to the face of the infant. In another embodiment, processor 1208 may be configured to determine an approximate body temperature by obtaining a temperature associated with tear duct (also referred to as lachrymal duct or nasolacrimal duct) regions 1339 of the infant's eyes. In general, tear duct regions 1339 exhibit temperatures that are more stable (e.g., less affected by ambient temperatures) and closer to the core temperature of a human body than other exposed skin parts of the body. Accordingly, processor 1208 in this embodiment may be configured to detect and track tear duct regions 1339 (e.g., inside corners of the eyes) as shown in FIG. 13, and determine an approximate body temperature by analyzing the radiometric data (e.g., temperature data) associated with thermal image pixels that correspond to the detected tear duct regions 1339.

In other embodiments, processor 1208 may be configured to calculate an approximate body temperature by performing other appropriate processing and analysis operations on the thermal images and the radiometric data contained therein. In various embodiments, processor 1208 may be configured to generate an alarm if the approximate body temperature determined from the thermal images is higher or lower than certain threshold values, so as to warn of high fever or other abnormal health conditions.

In yet another example of generating monitoring information, processor 1208 may be configured to analyze the thermal images to detect a presence of a foreign substance in an oronasal region of an infant. In one embodiment, processor 1208 may be configured to analyze the tracked oronasal region (e.g., oronasal region 1337) for patterns indicative of presence of a foreign substance. Because radiometric properties (e.g., temperature, emission/absorption wavelengths, emissivity, reflectance, and/or transmittance) of a foreign substance may be distinct from those of infant's skin or exhaled breaths, the thermal images of the tracked oronasal region may be analyzed for variances that may be indicative of presence of foreign substances. In other embodiments, processor 1208 may be configured to detect presence of a foreign substance by performing other appropriate object detection operations suitable for thermal images. In various embodiments, processor 1208 may be configured to generate an alarm if a foreign substance is detected in the oronasal region, so as notify that the infant may need to be cleaned up to prevent potential choking or otherwise need assistance.

In yet another example of generating monitoring information, processor 1208 may be configured to analyze the thermal images to determine the approximate posture of an infant (e.g., whether the infant is prone, supine, sitting up, or standing). As described above, the location of body, face, and facial features of an infant may be tracked in the thermal images. In one embodiment, processor 1208 may be configured to determine the approximate posture by analyzing the location and/or orientation of the face relative to the body. In another embodiment, the profile and/or the aspect ratio of the infant in the thermal images may be analyzed to determine the posture. In various embodiments, processor 1208 may be configured to determine the posture of the infant by performing any combination of posture detection operations described herein and other appropriate thermal image analysis operations for posture detection. In various embodiments, processor 1208 may be configured to receive a selection of an alarm-triggering posture from a user, and generate an alarm if the approximate posture of the infant is detected as matching the selected posture. Thus, for example, a user may choose to be notified or warned if the infant is standing up in a baby crib, so that the user may tend to the infant and/or prevent the infant from falling.

In yet another example, monitoring information that may be generated by processor 1208 includes user-viewable images (e.g., thermograms) of a scene (e.g., scene 1230) captured by infrared imaging module 1202. Processor 1208 may be configured to convert the thermal images using appropriate methods and algorithms. In one embodiment, the radiometric data (e.g., temperature data) contained in the pixels of the thermal images may be converted into gray-scaled or color-scaled pixels to construct images that can be viewed by a person. User-viewable thermal images may optionally include a legend or scale that indicates the approximate temperature of corresponding pixel color and/or intensity. Such user-viewable images may be viewed by a user (e.g., a parent, a caregiver) to visually check the condition of the infant even in when lights are turned off or dimmed (e.g., at night when the infant is in bed).

If visible light images of the scene are available (e.g., captured by visible light camera 1206), processor 1208 may be configured to superimpose, fuse, blend, or otherwise combine the thermal images and the visible light images to generate user-viewable images having a higher definition and/or contrast. For example, processor 1208 may be configured to generate combined images including radiometric data and/or other infrared characteristics corresponding to scene 1230 but with significantly more object detail (e.g., contour and/or edge detail) and/or contrast than typically provided by the thermal or visible light images alone, as further described herein. In another example, the combined images may include radiometric data and visible light characteristics (e.g., a visible spectrum color) corresponding to one or more objects (e.g., infant 1232) in scene 1230, as described for appropriate embodiments disclosed in various patent applications referenced herein such as, for example, U.S. Patent Application Nos. 61/473,207, 61/746,069, 61/746,074, 61/792,582, 61/793,952, 12/766,739, 13/105, 765, or 13/437,645, or International Patent Application No. PCT/EP2011/056432, or others as appropriate. Combined images generated in these examples may provide sufficient radiometric data, edge detail, and contrast to allow easier recognition and/or interpretation of the condition of infant 1232.

In yet another example, monitoring information that may be generated by processor 1208 includes an approximate ambient temperature near an infant. In one embodiment, processor 1208 may be configured to determine the ambient temperature from the radiometric data (e.g., temperature data) of pixels that correspond to the background. In one embodiment, the radiometric data may be aggregated and/or averaged for a more accurate determination of the ambient temperature. In other embodiments, processor 1208 may be configured to calculate an approximate ambient temperature by performing other appropriate processing and analysis operations on the thermal images and the radiometric data contained therein. In some embodiments, a conventional temperature sensor may be used to determine the ambient temperature in place of, or in addition to, the ambient temperature detection operation using the thermal images.

Memory 1210 may include one or more memory devices to store data and information, including thermal images and monitoring information. The one or more memory devices may include various types of memory for thermal image and other information storage including volatile and non-volatile memory devices, such as RAM (Random Access Memory), ROM (Read-Only Memory), EEPROM (Electrically-Erasable Read-Only Memory), flash memory, and/or a disk drive. In one embodiment, thermal images and monitoring information stored in the one or more memory devices may be retrieved later for purposes of reviewing and/or further diagnosing the conditions of the infant monitored by monitoring system 1200. In various embodiments, processor 1208 may be configured to execute software instructions stored on memory 1210 to perform various methods, processes, or operations in the manner described herein.

Display 1212 may be configured to present, indicate, or otherwise convey monitoring information generated by processor 1208. In various embodiment, display 1212 may be implemented with an electronic display screen, such as a liquid crystal display (LCD) a cathode ray tube (CRT), or various other types of generally known video displays and monitors. Display 1212 according to such embodiments may be suitable for presenting user-viewable thermal images converted by processor 1208 from thermal images captured by infrared imaging module 1202.

In various embodiments, display 1212 may be housed in a second housing distinct from housing 1220 where infrared imaging module 1202 may be disposed, so that the monitoring information may be viewed by a user (e.g., a parent, a caregiver) at a location remote from a scene (e.g., scene 1230) that may include at least a partial view of the infant. In some embodiments, existing display screens on external devices such as mobile phones, tablet devices, laptop computers, desktop computers, automobile information display systems, or any other devices that may receive the thermal images and/or the monitoring information from monitoring system 1200 to present the monitoring information to a user.

In this regard, communication modules 1214 may be configured to handle, manage, or otherwise facilitate wired and/or wireless communication between various components of monitoring system 1200 and between monitoring system 1200 and an external device. For example, infrared imaging module 1202, which may be disposed in housing 1220 and located at a suitable location for capturing thermal images of infant 1232, may transmit and receive data to and from processor 1208, which may be located at another location for viewing by a user, through communication modules 1214. In another example, infrared imaging module 1202 and/or processor 1208 may transmit and receive data to and from an external device, which may receive and further process raw/processed thermal images and/or monitoring information for presentation to a user, through communication module 1214 configured to manage wired and/or wireless connections.

In various embodiments, communication modules 1214 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), mobile cellular component, a wireless satellite component, or other appropriate wireless communication components. Communication module 1214 may also be configured for a proprietary wireless communication protocol and interface based on radio frequency (RF), microwave frequency (MWF), infrared frequency (IRF), and/or other appropriate wireless transmission technologies. Communication module 1214 may include an antenna coupled thereto for wireless communication purposes. Thus, in one example, communication module 1214 may handle, manage, or otherwise facilitate wireless communication by establishing wireless link to a wireless router, hub, or other appropriate wireless networking devices.

In various embodiments, communication module 1214 may be configured to interface with a wired network via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communication module 1206. Communication module 1214 may be configured to communicate over a wired link (e.g., through a network router, switch, hub, or other network devices) for wired communication purposes. For example, a wired link may be implemented with a power-line cable, a coaxial cable, a fiber-optics cable, or other appropriate cables or wires that support corresponding wired network technologies.

In some embodiments, monitoring system 1200 may comprise as many such communication modules 1214 as desired for various applications of monitoring system 1200 to suit various types of monitoring environments. In other embodiments, communication module 1214 may be integrated into or implemented as part of various other components of monitoring system 1200. For example, infrared imaging module 1202, processor 1208, and display 1212 may each comprise a subcomponent that may be configured to perform the operations of communication module 1214, and may communicate via wired and/or wireless connection without separate communication module 1214.

Motion sensors 1216 may be implemented in the same or similar manner as described with regard to motion sensors 194 in FIG. 1. Motion sensors 1216 may be monitored by and provide information to infrared imaging module 1202 and/or processor 1208 for performing various NUC techniques described herein.

In various embodiments, monitoring system 1200 may include a control panel 1217 having one or more user-activated mechanisms (e.g., buttons, knobs, sliders, etc.) configured to interface with a user and receive user input control signals. In some embodiments, control panel 1217 may be part of display 1212 configured to function as both a user input device and a display device. For example, control panel 1217 may be implemented as a graphical user interface (GUI) presented on display 1212 (e.g., a user actuated touch screen), having one or more images of the user-activated mechanisms (e.g., buttons, knobs, sliders, etc.) configured to interface with a user and receive user input control signals via display 1212. Thus, for example, a user may selectively turn on or off the various detections/alarms provided by monitoring system 1200 or adjust other configurations of monitoring system 1200 using control panel 1212. It will also be appreciated that a control panel may be implemented or presented at an external device (e.g., a mobile phone, a tablet device, a laptop computer, a desktop computer, an automobile information display system) or any other device that may be used to process thermal images and/or present monitoring information), which may receive user input signals and communicate them to monitoring system 1200.

Miscellaneous components 1218 may include any other device or component as may be desired for various application of monitoring system 1200. In some embodiments, miscellaneous components 1218 may include a warning light (e.g., a strobe light, a flashing light), a chime, a speaker with associated circuitry for generating a tone, or other appropriate devices that may be used to generate an audible and/or visible alert in response to the alarm generated by processor 1208. In some embodiments, miscellaneous components 1218 may include a microphone for capturing sound from, for example, infant 1232 in scene 1230, so that a user may hear any sound that infant 1232 makes in addition to viewing the monitoring information. In some embodiments, miscellaneous components 1218 may include a temperature sensor (e.g., a thermocouple, a thermometer), a moisture sensor, and other sensors that may provide reference data points for calibrating or verifying the various thermal image analytics described herein.

In various embodiments, one or more components of monitoring system 1200 may be combined and/or implemented or not, as desired or depending on application requirements. For example, processor 1208 may be combined with infrared imaging module 1202, memory 1210, and/or communication module 1214. In another example, processor 1208 may be combined with infrared imaging sensor 1202 with only certain operations of processor 1208 performed by circuitry (e.g., processor, logic device, microprocessor, microcontroller, etc.) within infrared imaging module 1202.

Figure 14:
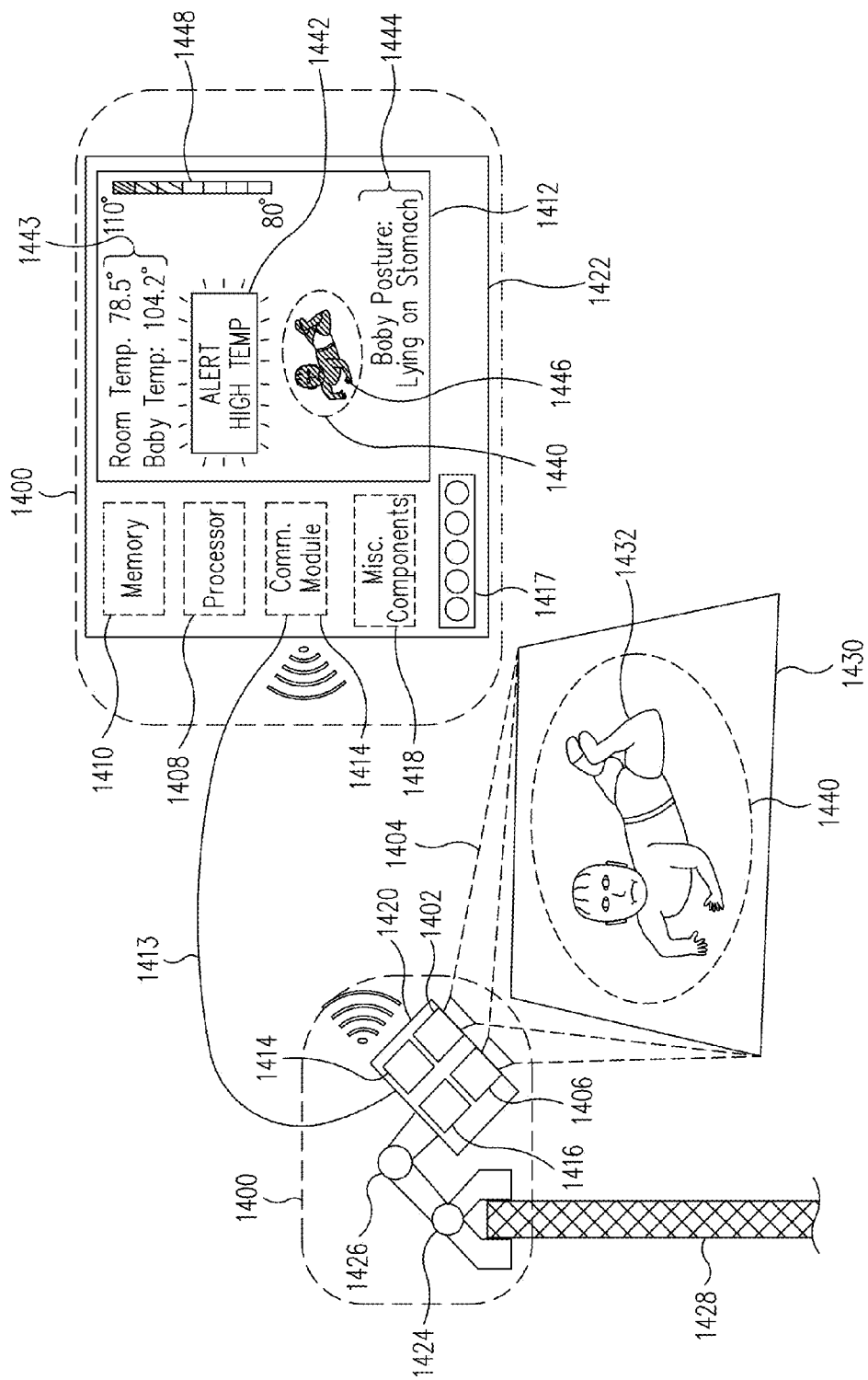
FIG. 14 illustrates an infant monitoring system provided in two separate housings in accordance with an embodiment of the disclosure.

FIG. 14 illustrates an infant monitoring system 1400 provided in a camera housing 1420 and a display housing 1422 in accordance with an embodiment of the disclosure. Monitoring system 1400 may include an infrared imaging module 1402, a visible light camera 1406, a processor 1408, a memory 1410, a display 1412, communication modules 1414, motion sensors 1416, a control panel 1417, and other miscellaneous components 1418, any one of which may be implemented in the same or similar manner as the corresponding components of monitoring system 1200 of FIG. 12.

Camera housing 1420 may be implemented in a similar manner as housing 1220, and may house infrared imaging module 1402, visible light camera 1406, communication module 1414, and motion sensors 1416. Camera housing 1420 may comprise a clamp 1424 or other suitable attachment mechanisms to releasably attach camera housing 1420 to a suitable structure 1428 (e.g., a bed rail, a headboard, a crib barrier, a frame of a stroller, a car seatback, or any other suitable part of a piece of furniture) at a location that allows at least a portion of an infant 1432 to be placed within an FOV 1404 of infrared imaging module 1402. Camera housing 1420 may further comprise an articulable joint 1426 or other similar mechanism for further adjusting the position, orientation, and/or angle of camera housing 1420. Thus, for example, a user may releasably attach and/or adjust camera housing 1420 to position infrared imaging module 1404 for capturing a scene 1430 that includes at least a portion of infant 1432, so as to monitor an infant in a crib, on a bed, in a play area, in a stroller, in a car, or any other place where an infant or other persons needing observation may be placed. As described above for housing 1222 of FIG. 12, camera housing 1420 may alternatively or additionally comprise a stand that may be configured to allow camera housing 1420 to be placed on a table top or any other substantially horizontal surfaces.

A display housing 1422 may be used to house display 1412 and communication module 1414. Other remaining components, such as processor 1408, memory 1410, and miscellaneous components 1418, may be housed in camera housing 1420, display housing 1422, or both (e.g., components may be replicated or divided into parts) as desired for various applications of monitoring system 1400. Display housing 1422 may be portable and separate from camera housing 1420, so that monitoring information may be viewed by a user at a location remote from scene 1430 captured by infrared imaging module 1402 in camera housing 1420. In this regard, communication modules 1414 may facilitate communication between a component (e.g., infrared imaging module 1402) housed in camera housing 1420 and another component (e.g., processor 1408) housed in display housing 1422 via a wired link 1413 (e.g., including a network router, switch, or hub) or a wireless link (e.g., including a wireless router or hub).

As shown in FIG. 14, in some embodiments, monitoring system 1200/1400 may allow a user to define a virtual boundary 1440. A user may define virtual boundary 1440 through, for example, an interaction with control panel 1217/1417 and/or the GUI presented on display 1212/1412. Virtual boundary 1440 may be defined by a user to delineate an area where it may be unsafe or otherwise undesirable for an infant to be present. For example, the area in scene 1430 outside virtual boundary 1440 may be indicated by a user as unsafe or otherwise undesirable. In this regard, processor 1208/1408 may be configured to detect the presence of and track the location of an infant as described above. Processor 1208/1408 may be further configured to perform to determine whether the approximate location of the infant falls outside a safe area defined by virtual boundary 1440, and generate an alarm upon determining that the infant may be outside virtual boundary 1440 or undetected in the thermal images. Thus, for example, a user can be alerted if an infant crawls out of a safe play zone, an infant falls off a bed, or otherwise moves out of a safe area defined by a virtual boundary. In one embodiment, processor 1208/1408 may be configured to detect an infant out of bound by analyzing and comparing pixel coordinates of the location of an infant with those of a safe area defined by a virtual boundary. In other embodiments, the detection may be performed using one or more image analysis operations (e.g., video analytics), which may include scene reconstruction operations, object tracking operations, and/or virtual tripwire detection operations.

FIG. 14 also shows an example screenshot on display 1412. Some or all of the monitoring information generated by processor 1208/1408 may be presented on display 1212/1412 in various text and/or graphical forms. In some embodiments, some or all of the monitoring information may be provided additionally or alternatively in audible form, as well as through various indicators and lights (e.g., flashing alarm lights). This example screenshot shows an alarm 1442, temperature information 1443, infant posture information 1444, and a user-viewable image of the scene presented on display 1212/1412 for viewing by a user. The user-viewable image may show a thermographic shape 1446 of the infant, as well as a temperature scale 1448. The user-viewable image may also be presented in a more natural color (e.g., using visible light images alone or combined with thermal images), in addition to or as an alternative to presenting thermograms. Thus, through display 1212/1412, a user may view images of the scene (e.g., scene 1230/1430) including the infant (e.g., infant 1232/1432) even in complete darkness, and at the same time advantageously obtain various alerts and descriptions of the monitoring information.

Therefore, monitoring system 1200/1400 may be conveniently placed for a remote monitoring of an infant or other persons for whom observation is desired or needed. By capturing, processing, and analyzing thermal images of a scene including at least a partial view of an infant, monitoring system 1200/1400 may determine various conditions associated with the scene and the infant, and generate monitoring information. The monitoring information may include, but is not limited to, alarms to warn of an abnormal breathing, an abnormal temperature, a posture change, a foreign substance in mouth/nose, and an infant out of a safe zone, as well as various conditions (e.g., posture, temperature) associated with the infant and user-viewable images converted from thermal images of the scene. Monitoring system 1200/1400 may thus advantageously provide an active warning to caregivers, and thereby help prevent death, injury, or other harm attributable to SIDS and other conditions of the infant and/or the environment. Monitoring system 1200/1400 may also advantageously provide to caregivers a clear view of the infant even when the infant is placed in a low or no light environment.

Figure 15:
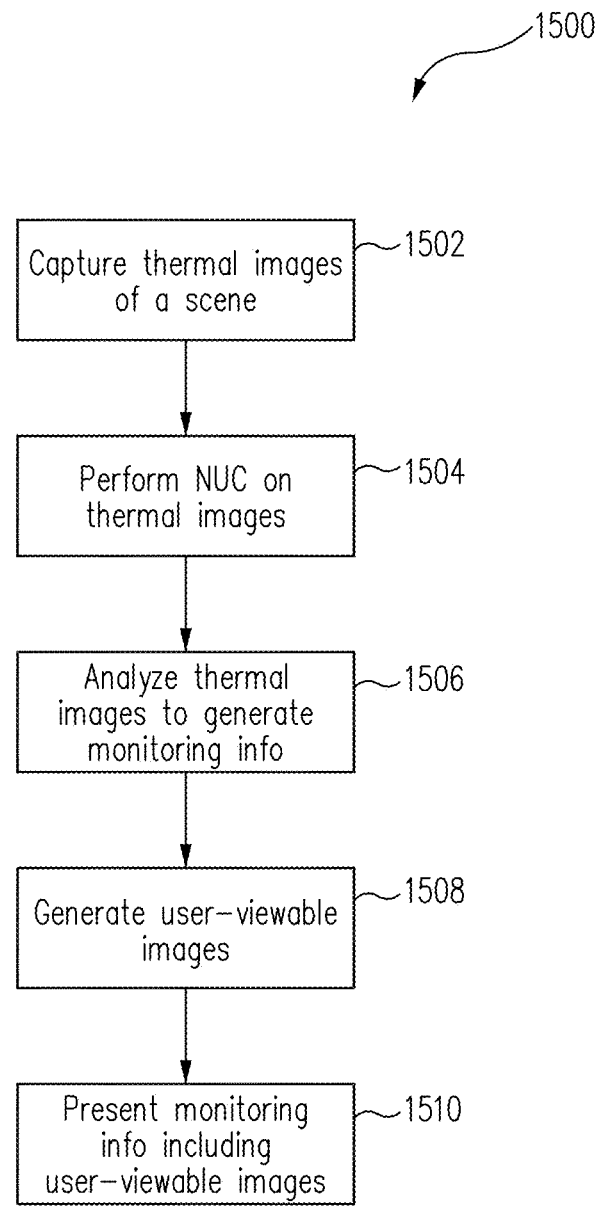
FIG. 15 illustrates a process for monitoring an infant using thermal imaging in accordance with an embodiment of the disclosure.

Referring now to FIG. 15, a flowchart is illustrated of a process 1500 for monitoring of an infant using thermal imaging in accordance with an embodiment of the disclosure. For example, process 1500 may be performed by monitoring system 1200/1400 for monitoring infant 1232/1432. It should be appreciated that monitoring system 1200/1400 and infant 1232/1432 are identified only for purposes of giving examples and that any other suitable system may be used to perform all or part of process 1500.

At block 1502, thermal images (e.g., containing pixels with radiometric data) of a scene (e.g., scene 1230/1430) comprising at least a partial view of an infant (e.g., infant 1232/1432) may be captured by an infrared imaging module (e.g., infrared imaging module 1202/1402). The captured thermal images may be radiometrically calibrated thermal images as described above in connection with infrared imaging module 1202/1402. Also, in some embodiments, the captured thermal images may be scale and/or perspective calibrated thermal images. That is, geometric properties (e.g., size and position) of objects (e.g., an infant) in the actual scene can be derived from the pixel coordinates of objects in the thermal images. Scale/perspective calibration may be performed manually or automatically using suitable techniques when infrared imaging module (e.g., infrared imaging module 1202/1402) is first installed at a desired location. In some embodiments, automatic recalibration may also be performed using suitable techniques periodically after installation.

The captured thermal images may be received, for example, at processor 1208/1408 that is communicatively coupled to infrared imaging module 1202/1402. In some embodiments, the captured thermal images may be transmitted from an infrared imaging module via wireless or wired connection using appropriate network protocols and interfaces (e.g., through communication module 1214/1414) to a processor located remotely and separately from the infrared imaging module. For example, the captured thermal images may be transmitted wirelessly to processor 1208/1408, which may be co-located with display 1212/1412 in display housing 1422 placed near a user (e.g., a parent, a caregiver) for remotely monitoring of an infant. At block 1504, an NUC process may be performed on the captured thermal images to remove noise therein, for example, by using various NUC techniques disclosed herein.

At block 1506, the captured thermal images may be analyzed to generate monitoring information regarding the infant. For example, various analysis and processing operations may be performed on the captured thermal images to detect and track the infant, and determine various attributes associated with the infant and/or the scene.

In one embodiment, regions of contiguous pixels having temperature values in a specific range may be detected from the radiometrically calibrated thermal images for detection and tracking of the infant. For example, the detection operation may differentiate a region (or a "blob") having a surface temperature distribution that is characteristic of an infant (e.g., with an exposed face). The thermal images and the blob detected therein may be further processed and/or analyzed, for example, by performing various filtering operations and analyzing the size, shape, and/or thermal characteristics of the blobs, to ascertain the detection of the infant and to further localize the face and facial features for tracking. As described above with respect to FIG. 13, facial features such as the eyes, mouth, and nostrils generally exhibit temperatures higher than other exposed area of the face. Thus, in one example, filtering operations such as dilation and threshold filtering performed on the detected blob may be utilized to further localize the facial features. Also, the size, shape, and/or radiometric properties of the localized facial features may be further analyzed if needed to ascertain the detection of the facial features.

In another embodiment, the thermal images may be analyzed to detect one or more candidate foreground objects, for example, using background modeling techniques, edge detection techniques, or other foreground object detection techniques suitable for use with thermal images. The radiometric properties (e.g., surface temperature distribution) of the candidate objects may then be analyzed to determine whether they correspond to those of an infant that may be present in the scene. For example, a doll placed on a baby crib may initially be detected as a candidate foreground object, but its radiometric properties may then quickly reveal that it does not have a surface temperature distribution characteristic of an infant and thus is not an infant. As this example shows, object detection using the thermal images may be less susceptible to false detection of spurious objects compared with object detection techniques using visible light images. The size and shape of the candidate objects may also be analyzed, so that the detection may be ascertained based on the size, the shape, and the radiometric properties of the detected candidates. As described above, further processing and analysis operations may be performed if needed to localize and track the facial features of the infant.

In one aspect of this embodiment, background modeling techniques may be used to detect objects in the scene. Because the background (e.g., a baby crib or bed) of the scene rarely changes and because thermal images are generally insensitive to changing lighting conditions, a background model (e.g., pixels that belong to a background) may be constructed with high accuracy, and a region of pixels different from the background (also referred to as a "region of interest") may easily be distinguished as a candidate foreground object. As described above, the radiometric properties of such a region of interest (ROI) may then be analyzed to further ascertain whether the detected ROI likely represent an infant or not.

In various embodiments, the various processing and analysis operations described for block 1506 may be omitted or included, and may be performed in any other order as appropriate for detecting and tracking an infant and/or its face. For example, in some embodiments, detecting a warm "blob" in the thermal images may be sufficient to detect and track an infant in a scene, whereas in other embodiments various thermal image analytics may be performed in combination to increase the accuracy of the detection and tracking.

In some embodiments, if visible light images are available (e.g., captured by visible light camera 1206), operations for block 1506 may additionally or alternatively involve performing suitable face detection and tracking algorithms on the visible light images or combined images of the visible light images and the thermal images. If the detection and tracking of the face and facial features are performed using the visible light images, operations for block 1506 may further involve converting pixel coordinates of the tracked face and facial features in the visible light images to corresponding pixel coordinates in the thermal images. Other appropriate techniques for detecting and tracking objects in the thermal images by analyzing the thermal images, visible light images, and/or combined images may also be utilized for block 1506.

Various attributes associated with the infant and/or the scene may be determined to generate monitoring information, by further analysis and processing and/or during the processing and analysis performed for detection and tracking. For example, the approximate body temperature, the approximate ambient temperature, the relative location of the infant in the scene, and the posture of the infant may be determined by analyzing and processing the thermal images as described above for processor 1208 of FIG. 12. As further described with respect to processor 1208 of FIG. 12, the various attributes may be further analyzed and/or processed to generate alarms to warn of an abnormal body temperature, a posture change, and an infant moving out of a safe zone. In another example, exhaled breaths from the infant may be detected by further analyzing the tracked oronasal region, and alarms may be generated if an abnormal breathing pattern is detected as described above with respect to processor 1208 of FIG. 12. As also described for processor 1208, an alarm may be generated if a foreign substance is detected in the tracked oronasal region of the infant.

At block 1508, user-viewable images of the scene may be generated. In one embodiment, the user-viewable images may be generated by converting the thermal images using appropriate methods and algorithms. For example, the thermal data (e.g., temperature data) contained in the pixels of the thermal images may be converted into gray-scaled or color-scaled pixels to construct images that can be viewed by a person. The user-viewable thermal images may optionally include a legend or scale that indicates the approximate temperature of corresponding pixel color and/or intensity.

In some embodiments, process 1500 may further include capturing a visible light image of the scene using a visible light camera (e.g., visible light camera 1206/1406). In such embodiments, user-viewable may optionally be presented in a more natural color using visible light images alone or combined with thermal images instead of presenting thermograms when, for example, enough light is available to generate discernible visible light images. In this regard, for some embodiments, operations for block 1508 may also involve fusing or combining the thermal images and the visible light images to generate user-viewable images having a higher definition, contrast, and/or detail.

Figure 16:
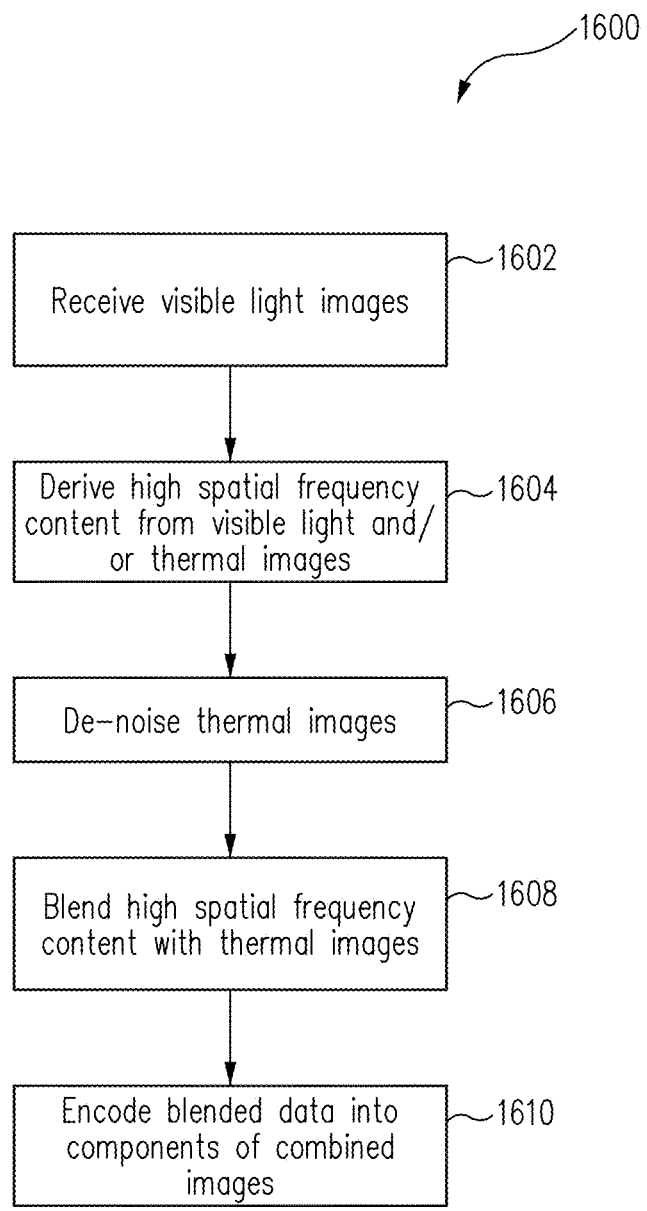
FIG. 16 illustrates a process to combine thermal images and visible light images in accordance with an embodiment of the disclosure.

The fusing or combining operations in accordance with one or more embodiments may be described in further detail with reference to FIG. 16, which is a flowchart of a process 1600 to combine or fuse the thermal images and the visible light images. The combined images may include radiometric data and/or other infrared characteristics corresponding to scene 1230/1430, but with significantly more object detail (e.g., contour or edge detail) and/or contrast than typically provided by the thermal or visible light images alone. Thus, for example, the combined images generated in these examples may beneficially provide sufficient radiometric data, detail, and contrast to allow easier recognition and/or interpretation of the condition of infant 1232/1432.

At block 1602, visible light images may be received. For example, as described above, visible light images of scene 1230/1430 may be captured by visible light camera 1206/1406, and the captured visible light images may be received by processor 1208/1408 in similar manner as described for receiving the thermal images in block 1502. Thus, processor 1208/1408 may perform various operations of process 1600 using both the thermal images and visible light images, for example.

At block 1604, high spatial frequency content from one or more of the visible light and thermal images may be derived at block 1608. For example, processor 1208/1408 may be configured to derive high spatial frequency content from one or more of the visible light and thermal images received in blocks 1602 and/or 1502. High spatial frequency content derived according to various embodiments may include edge/contour details and/or high contrast pixels extracted from the one or more of the visible light and thermal images, for example.

In one embodiment, high spatial frequency content may be derived from the received images by performing a high pass filter (e.g., a spatial filter) operation on the images, where the result of the high pass filter operation is the high spatial frequency content. In an alternative embodiment, high spatial frequency content may be derived from the received images by performing a low pass filter operation on the images, and then subtracting the result from the original images to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, optical elements 1203 of infrared imaging module 1202/1402 and/or optical elements of visible light camera 1206/1406 may be configured to introduce vibration, de-focusing, and/or movement artifacts into a series of images captured by one or both of infrared imaging module 1202/1402 and visible light camera 1206/1406. High spatial frequency content may be derived from subtractions of adjacent or semi-adjacent images in the series.

In some embodiments, high spatial frequency content may be derived from only the visible light images or the thermal images. In other embodiments, high spatial frequency content may be derived from only a single visible light or thermal image. In further embodiments, high spatial frequency content may be derived from one or more components of the visible light and/or thermal mages, such as a luminance component of visible light images, for example, or a radiometric component of thermal images. Resulting high spatial frequency content may be stored temporarily (e.g., in memory 1210/1410) and/or may be further processed according to block 1608.

At block 1606, one or more thermal images may be de-noised. For example, processor 1208/1408 may be configured to de-noise, smooth, or blur one or more thermal images of scene 1230/1430 using a variety of image processing operations. In one embodiment, removing high spatial frequency noise from the thermal images allows the processed thermal images to be combined with high spatial frequency content derived according to block 1604 with significantly less risk of introducing double edges (e.g., edge noise) to objects depicted in combined images of scene 1230/1430.

In one embodiment, removing noise from the thermal mages may include performing a low pass filter (e.g., a spatial and/or temporal filter) operation on the images, where the result of the low pass filter operation is de-noised or processed thermal images. In a further embodiment, removing noise from one or more thermal images may include down-sampling the thermal images and then up-sampling the images back to the original resolution.

In another embodiment, processed thermal images may be derived by actively blurring thermal images of scene 1230/1430. For example, optical elements 1203 may be configured to slightly de-focus one or more thermal images captured by infrared imaging module 1202/1402. The resulting intentionally blurred thermal images may be sufficiently de-noised or blurred so as to reduce or eliminate a risk of introducing double edges into combined images of scene 1230/1430, as further described below. In other embodiments, blurring or smoothing image processing operations may be performed by processor 1208/1408 on the received thermal images as an alternative or supplement to using optical elements 1203 to actively blur thermal images of scene 1230/1430. Resulting processed thermal images may be stored temporarily (e.g., in memory 1210/1410) and/or may be further processed according to block 1608.

At block 1608, high spatial frequency content may be blended with one or more thermal images. For example, processor 1208/1408 may be configured to blend high spatial frequency content derived in block 1604 with one or more thermal images of scene 1230/1430, such as the processed thermal images provided in block 1606.

In one embodiment, high spatial frequency content may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of scene 1230/1430, but may not exist within the interior of such objects. In such embodiments, blended image data may simply include the high spatial frequency content, which may subsequently be encoded into one or more components of combined images, as described in block 1610.

For example, a radiometric component of thermal images may be a chrominance component of the thermal images, and the high spatial frequency content may be derived from the luminance and/or chrominance components of visible light images. In this embodiment, combined images may include the radiometric component (e.g., the chrominance component of the thermal images) encoded into a chrominance component of the combined images and the high spatial frequency content directly encoded (e.g., as blended image data but with no thermal image contribution) into a luminance component of the combined images. By doing so, a radiometric calibration of the radiometric component of the thermal images may be retained. In similar embodiments, blended image data may include the high spatial frequency content added to a luminance component of the thermal images, and the resulting blended data encoded into a luminance component of resulting combined images.

In other embodiments, high spatial frequency content may be derived from one or more particular components of one or a series of visible light and/or thermal images, and the high spatial frequency content may be encoded into corresponding one or more components of combined images. For example, the high spatial frequency content may be derived from a luminance component of visible spectrum images, and the high spatial frequency content, which in this embodiment is all luminance image data, may be encoded into a luminance component of combined images.

In another embodiment, high spatial frequency content may be blended with thermal images using a blending parameter and an arithmetic equation. For example, in one embodiment, the high spatial frequency content may be derived from a luminance component of visible light images. In such an embodiment, the high spatial frequency content may be blended with a corresponding luminance component of thermal image according to a blending parameter and a blending equation to produce blended image data. The blended image data may be encoded into a luminance component of combined images, for example, and the chrominance component of the thermal images may be encoded into the chrominance component of the combined images. In embodiments where the radiometric component of the infrared images may be their chrominance component, the combined images may retain a radiometric calibration of the thermal images. In other embodiments, portions of the radiometric component may be blended with the high spatial frequency content and then encoded into combined images.

More generally, the high spatial frequency content may be derived from one or more components of visible light images and/or thermal image. In such an embodiment, the high spatial frequency content may be blended with one or more components of the thermal images to produce blended image data (e.g., using a blending parameter and a blending equation), and resulting combined images may include the blended image data encoded into corresponding one or more components of the combined images. In some embodiments, the one or more components of the blended data do not have to correspond to the eventual one or more components of the combined images (e.g., a color space/format conversion may be performed as part of an encoding process).

A blending parameter value may be selected by a user (e.g., via control panel 1217/1417), or may be automatically determined by processor 1208/1408 according to context or other data, for example, or according to an image enhancement level expected by infant monitoring system 1200/1400.

In some embodiments, the blending parameter may be adjusted or refined using a knob of control panel 1217/1417, for example, while combined images are being displayed by display 1212/1412. In some embodiments, a blending parameter may be selected such that blended image data includes only thermal characteristics, or, alternatively, only visible light characteristics. A blending parameter may also be limited in range, for example, so as not to produce blended data that is out-of-bounds with respect to a dynamic range of a particular color space/format or a display.

In addition to or as an alternative to the processing described above, processing according to the high contrast mode may include one or more processing steps, ordering of processing steps, arithmetic combinations, and/or adjustments to blending parameters as disclosed in U.S. patent application Ser. No. 13/437,645 previously referenced herein. For example, the following equations may be used to determine the components Y, Cr and Cb for the combined images with the Y component from the high pass filtered visible light images and the Cr and Cb components from the thermal images.

$$hp\_y\_vis = highpass(y\_vis)$$

$$(y\_ir, cr\_ir, cb\_ir) = colored(lowpass(ir\_signal\_linear))$$

In the above equations, highpass(y_vis) may be high spatial frequency content derived from high pass filtering a luminance component of visible light images. Colored(lowpass(ir_signal_linear)) may be the resulting luminance and chrominance components of the thermal images after the thermal images are low pass filtered. In some embodiments, the thermal images may include a luminance component that is selected to be 0.5 times a maximum luminance (e.g., of a display and/or a processing step). In related embodiments, the radiometric component of the thermal images may be the chrominance component of the thermal images. In some embodiments, the y_ir component of the thermal images may be dropped and the components of the combined images may be (hp_y_vis, cr_ir, cb_ir), using the notation above.

In another embodiment, the following equations may be used to determine the components Y, Cr and Cb for combined images with the Y component from the high pass filtered visible light images and the Cr and Cb components from the thermal images.

$$comb\_y = y\_ir + alpha \times hp\_y\_vis$$

$$comb\_cr = cr\_ir$$

$$comb\_cb = cb\_ir$$

The variation of alpha thus gives the user an opportunity to decide how much contrast is needed in the combined images. With an alpha of close to zero, the thermal images alone will be shown, but with a very high alpha, very sharp contours/edges can be seen in the combined images. Theoretically, alpha can be an infinitely large number, but in practice a limitation will probably be necessary, to limit the size of alpha that can be chosen to what will be convenient in the current application.

Once the high spatial frequency content is blended with one or more thermal images, processing may proceed to block 1610, where blended data may be encoded into components of the combined images in order to form the combined images.

At block 1610, the blended data may be encoded into one or more components of the combined images. For example, processor 1208/1408 may be configured to encode blended data derived or produced in accordance with block 1608 into combined images that increases, refines, or otherwise enhances the information conveyed by either the visible light or thermal images viewed by themselves. In some embodiments, encoding blended image data into a component of combined images may include additional image processing operations, for example, such as dynamic range adjustment, normalization, gain and offset operations, noise reduction, and color space conversions, for instance.

In addition, processor 1208/1408 may be configured to encode other image data into combined images. For example, if blended image data is encoded into a luminance component of combined images, a chrominance component of either visible light images or thermal images may be encoded into a chrominance component of combined images. Selection of source images may be made through user input, for example, or may be determined automatically based on context or other data. More generally, in some embodiments, a component of combined images that is not encoded with blended data may be encoded with a corresponding component of visible light images or thermal images. By doing so, a radiometric calibration of thermal images and/or a color space calibration of visible light images may be retained in the resulting combined images.

Returning to FIG. 15, the combined images obtained according to one or more embodiments of process 1600 may then be utilized at block 1508 to generate user-viewable images having higher contrast and/or detail than those that may be generated using thermal images alone.

At block 1510, the generated monitoring information, including the user-viewable images, may be presented to a user. For example, some or all of the monitoring information may be presented on a display (e.g., display 1212/1412) as text descriptions, graphics, and/or icons, as shown in the example screenshot of display 1412. In some embodiments, some of the monitoring information may be presented additionally or alternatively in audible form. For example, users may be notified of the various alarms by sounding a siren and/or delivering a computer-generated or pre-recorded speech announcement, using a speaker, a bell, a siren, a chime, and/or other components for generating sound. In some embodiments, some or all of the monitoring information may be presented using various lights and indicators. For example, segmented LED indicators may be used to present temperature information, and flashing lights may be used to indicate the various alarms.

In one embodiment, the generated monitoring information may be transmitted from a processor via wireless or wired connection using appropriate network protocols and interfaces (e.g., through communication module 1214/1414) to a remotely located display or an external device to present the monitoring information. In one embodiment, the generated monitoring information may be converted, wrapped, structured or otherwise formatted for data exchange with an external device using suitable application layer protocols (e.g., Simple Object Access Protocol (SOAP), Hypertext Transfer Protocol (HTTP)) or a proprietary data exchange format.

Therefore, process 1500 may advantageously provide non-contact (e.g., without placing sensor patches on body or sensor pads on mattresses) and active (e.g., automatically detecting) monitoring of various conditions associated with an infant, and permit a user to conveniently view the monitoring information at a remote location and/or an external device. Process 1500 may also advantageously provide user-viewable images of a scene including at least a partial view of an infant, even when the scene receives little or no illumination.

Although various image processing techniques have been described (e.g., particularly in relation to FIGS. 15 and 16), any of the various processing techniques set forth in any of the patent applications referenced herein may be used. For example, in some embodiments, visible images and/or thermal images may be blended or otherwise combined in accordance with any of the techniques set forth in U.S. Patent Application Nos. 61/473,207, 61/746,069, 61/746,074, 61/792,582, 61/793,952, 12/766,739, 13/105,765, or 13/437,645, or International Patent Application No. PCT/EP2011/056432, or others as appropriate.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A monitoring system comprising:
    an infrared imaging module comprising a focal plane array (FPA) configured to capture thermal images of a scene within a field of view (FOV) of the infrared imaging module;
    a housing at least partially enclosing the infrared imaging module and configured to be positioned to place at least a portion of an infant within the FOV; and
    a processor in communication with the infrared imaging module and the visible light camera, the processor configured to:
    track an oronasal region of the infant in the thermal images;
    analyze thermal data in pixels of the thermal images corresponding to the tracked oronasal region to detect a periodic presence of $CO_2$ gas imaged in the tracked oronasal region represented by a periodic variation in the thermal data;
    determine whether the infant is breathing normally based on the analysis of the thermal data in the pixels corresponding to the tracked oronasal region to detect the periodic presence of the imaged $CO_2$ gas; and
    generate monitoring information relating to the infant, the monitoring information comprising an alarm generated in response to determining that the infant is not breathing normally.

2. The monitoring system of claim 1, wherein the housing also substantially encloses the processor, the monitoring system further comprising:
    a visible light camera having a FOV at least partially overlapping the FOV of the infrared imaging module, the visible light camera configured to capture visible light images of at least a portion of the scene; and
    a communication module configured to transmit at least one user-viewable image over a network to an external device,
    wherein the processor is further configured to:
    track the oronasal region of the infant in the thermal images by analyzing the visible light images, the thermal images, or both;
    derive high spatial frequency content from at least one of the visible light images; and
    generate the at least one user-viewable image of the scene using at least one of the thermal images by adding the high spatial frequency content to the at least one thermal image to improve contrast and edge detail in the at least one user-viewable image.

3. The monitoring system of claim 1, wherein the processor is positioned remotely from the infrared imaging module and the housing.

4. The monitoring system of claim 1, wherein the processor is configured to:
    analyze the thermal images to determine a body temperature of the infant;
    determine whether the body temperature of the infant is normal; and
    generate an alarm upon a determination that the body temperature of the infant is abnormal.

5. The monitoring system of claim 1, wherein the processor is configured to:
    analyze the thermal images to determine a posture of the infant;
    determine whether the posture of the infant is a posture selected by a user; and
    generate an alarm upon a determination that the posture matches the posture selected by the user.

6. The monitoring system of claim 1, wherein the processor is configured to:
    analyze the thermal images to detect the infant from the scene; and
    generate an alarm if the infant is undetected in the thermal images or if the infant is undetected in an area defined by a user.

7. The monitoring system of claim 1, wherein:
    the processor is configured to:
    track a facial area of the infant in the thermal images;
    analyze thermal data in pixels of the thermal images corresponding to the tracked facial area to detect a presence of pixels representing radiometric properties distinct from those of the infant's skin or exhaled breaths; and
    determine whether a foreign substance is present in the facial area of the infant based on the analysis of the thermal data to detect the presence of the pixel representing radiometric properties distinct from those of the infant's skin or exhaled breaths; and
    the monitoring information further comprises an alarm generated in response to determining that the foreign substance is present in the facial area of the infant.

8. The monitoring system of claim 1, wherein:
the thermal images are unblurred thermal images of the scene;
the infrared imaging module is configured to capture intentionally blurred thermal images of the scene; and
the processor is configured to determine a plurality of non-uniform correction (NUC) terms based on the intentionally blurred thermal images and apply the NUC terms to the unblurred thermal images to remove noise from the unblurred thermal images.

9. A method comprising:
capturing, at a focal plane array (FPA) of an infrared imaging module, thermal images of a scene within a field of view (FOV) of the infrared imaging module, wherein the infrared imaging module is positioned so that at least a portion of an infant is placed within the FOV of the infrared imaging module;
tracking an oronasal region of the infant in the thermal images;
analyzing thermal data in pixels of the thermal images corresponding to the tracked oronasal region to detect a periodic presence of $CO_2$ as imaged in the tracked oronasal region represented by a periodic variation in the thermal data;
determining whether the infant is breathing normally based on the analysis of the thermal data in the pixels corresponding to the tracked oronasal region to detect the periodic presence of the imaged; $CO_2$ gas; and
generating monitoring information relating to the infant, the monitoring information comprising an alarm generated in response to determining that the infant is not breathing normally.

10. The method of claim 9, further comprising:
capturing, using a visible light camera having an FOV at least partially overlapping the FOV of the infrared imaging module, visible light images of at least a portion of the scene;
deriving high spatial frequency content from at least one of the visible light images;
generating at least one user-viewable image of the scene using at least one of the thermal images by adding the high spatial frequency content to the at least one thermal image to improve contrast and edge detail in the at least one user-viewable image; and
transmitting the at least one user-viewable image over a network to an external device,
wherein the tracking of the oronasal region of the infant in the thermal images is by analyzing the visible light images, the thermal images, or both.

11. The method of claim 9, wherein the generating is performed by a processor positioned remotely from the infrared imaging module.

12. The method of claim 9, further comprising:
analyzing the thermal images to determine a body temperature of the infant;
determining whether the body temperature of the infant is normal; and
generating an alarm upon a determination that the body temperature of the infant is abnormal.

13. The method of claim 9, further comprising:
analyzing the thermal images to determine a posture of the infant;
determining whether the posture of the infant is one of postures selected by a user; and
generating an alarm upon a determination that the posture matches one of the postures selected by the user.

14. The method of claim 9, further comprising:
analyzing the thermal images to detect the infant from the scene; and
generating an alarm if the infant is undetected in the scene or if the infant is undetected in an area defined by a user.

15. The method of claim 9, further comprising:
tracking a facial area of the infant in the thermal images;
analyzing thermal data in pixels of the thermal images corresponding to the tracked facial area to detect a presence of pixels representing radiometric properties distinct from those of the infant's skin or exhaled breaths; and
determining whether a foreign substance is present in the facial area of the infant based on the analysis of the thermal data to detect the presence of the pixel representing radiometric properties distinct from those of the infant's skin or exhaled breaths;
wherein the monitoring information further comprises an alarm generated in response to determining that the foreign substance is present in the facial area of the infant.

16. The method of claim 9, wherein the thermal images are unblurred thermal images, the method further comprising:
capturing intentionally blurred thermal images of the scene;
determining a plurality of non-uniform correction (NUC) terms based on the intentionally blurred thermal images; and
applying the NUC terms to the unblurred thermal images to remove noise from the unblurred thermal images.

17. The monitoring system of claim 1, wherein the processor is configured to:
detect the periodic presence of $CO_2$ gas by detecting a periodic variation in the temperature and/or shape of the tracked oronasal region represented by the periodic variation in the thermal data; and
determine whether the infant is breathing normally based on the analysis of the thermal data in the pixels corresponding to the tracked oronasal region to detect the periodic variation in the temperature and/or shape of the tracked oronasal region.

18. The method of claim 9, wherein:
the analyzing of the thermal data in the pixels corresponding to the tracked oronasal region to detect the periodic presence of $CO_2$ comprises detecting a periodic variation the temperature and/or shape of the tracked oronasal region represented by the periodic variation in the thermal data; and
determining of whether the infant is breathing normally is based on the analyzing of the thermal data in the pixels corresponding to the tracked oronasal region to detect the periodic variation in the temperature and/or shape of the tracked oronasal region.

* * * * *